(12) United States Patent
Kin et al.

(10) Patent No.: US 10,457,786 B2
(45) Date of Patent: Oct. 29, 2019

(54) BIAXIALLY-STRETCHED FILM AND ETHYLENE POLYMER COMPOSITION

(71) Applicant: PRIME POLYMER CO., LTD., Tokyo (JP)

(72) Inventors: Keiko Kin, Chiba (JP); Tsutomu Tasaki, Chiba (JP); Toshitaka Kanai, Sodegaura (JP)

(73) Assignee: PRIME POLYMER CO., LTD., Tokyo (JP)

( * ) Notice: Subject to any disclaimer, the term of this patent is extended or adjusted under 35 U.S.C. 154(b) by 183 days.

(21) Appl. No.: 14/768,848

(22) PCT Filed: Feb. 19, 2014

(86) PCT No.: PCT/JP2014/053946
§ 371 (c)(1),
(2) Date: Aug. 19, 2015

(87) PCT Pub. No.: WO2014/129511
PCT Pub. Date: Aug. 28, 2014

(65) Prior Publication Data
US 2015/0376358 A1    Dec. 31, 2015

(30) Foreign Application Priority Data

Feb. 20, 2013   (JP) ................................ 2013-030927

(51) Int. Cl.
| | |
|---|---|
| *C08J 5/18* | (2006.01) |
| *C08F 210/16* | (2006.01) |
| *C08L 23/08* | (2006.01) |
| *B29K 23/00* | (2006.01) |
| *B29C 55/14* | (2006.01) |

(52) U.S. Cl.
CPC .............. *C08J 5/18* (2013.01); *C08F 210/16* (2013.01); *C08L 23/0815* (2013.01); *B29C 55/143* (2013.01); *B29K 2023/08* (2013.01); *C08J 2323/06* (2013.01); *C08J 2323/08* (2013.01); *C08J 2423/06* (2013.01)

(58) Field of Classification Search
CPC ................................ C08L 23/0815; C08J 5/18
See application file for complete search history.

(56) References Cited

U.S. PATENT DOCUMENTS

| | | | |
|---|---|---|---|
| 4,597,920 A | 7/1986 | Golike | |
| 5,155,080 A | 10/1992 | Razavi | |
| 5,321,106 A | 6/1994 | Lapointe | |
| 5,387,568 A | 2/1995 | Ewen | |
| 5,519,100 A | 5/1996 | Elder | |
| 5,561,092 A | 10/1996 | Ewen | |
| 7,153,566 B2 * | 12/2006 | Yano | ........................ C08J 5/18 428/315.7 |
| 7,208,559 B2 * | 4/2007 | Satoh | ...................... C08F 10/00 502/123 |
| 7,722,961 B2 * | 5/2010 | Tasaki | ........................ C08J 5/18 428/500 |
| 8,299,193 B2 | 10/2012 | Akashi | |
| 2007/0032601 A1 | 2/2007 | Nishimura | |
| 2008/0090983 A1 * | 4/2008 | Satoh | ...................... C08F 10/00 526/348.2 |
| 2009/0018299 A1 | 1/2009 | Akashi | |
| 2009/0270580 A1 | 10/2009 | Sugimura | |
| 2009/0291285 A1 | 11/2009 | Bando | |
| 2010/0292421 A1 | 11/2010 | Bando | |
| 2015/0018491 A1 * | 1/2015 | Satoh | .................. C08L 23/0815 525/240 |

FOREIGN PATENT DOCUMENTS

| | | |
|---|---|---|
| CN | 101490116 A | 7/2009 |
| CN | 101550247 A | 10/2009 |
| EP | 2799486 | 11/2014 |
| JP | 57181828 A2 | 11/1982 |
| JP | 5890924 | 5/1983 |
| JP | 1501950 | 7/1989 |
| JP | 1502036 | 7/1989 |

(Continued)

OTHER PUBLICATIONS

Evolue SP1540 flyer, no date.*
Evolue flyer, 2005.*
Evolue SP3010, 2005.*
Evolue SP1510, 2005.*
Chinese Office Action dated Feb. 4, 2017 issued in the corresponding Chinese patent application No. 201480009488.2 and its partial English translation.
International Search Report dated Apr. 22, 2014 filed in PCT/JP2014/053946.
Kazuo Soga et al., Catalytic Olefin Polymerization, Kodansha Scientific Ltd., 1990, p. 376.; Cited in Specification.
Walter Kaminsky, Makromol.Chem. 193, 1992, pp. 606-607.; Cited in Specification.

(Continued)

*Primary Examiner* — Irina Krylova
(74) *Attorney, Agent, or Firm* — Rankin, Hill & Clark LLP

(57) ABSTRACT

Provided is a biaxially-stretched film wherein the biaxial stretching is possible in a broader temperature range and which is excellent in thickness accuracy, and an ethylene polymer composition serving as a raw material of the film. The biaxially-stretched film of the present invention is obtained from an ethylene polymer composition (E) including a specific ethylene polymer component (A) containing 20 to 100 wt % of an ethylene polymer (a) being a copolymer of ethylene and a C4-10 α-olefin and having specific melt flow rate and density, and an ethylene polymer component (B) being another copolymer of ethylene and a C4-10 α-olefin, wherein a weight fraction [$W_A$] of the ethylene polymer component (A) is 0.50 or more and 0.92 or less, and a weight fraction [$W_B$] of the ethylene polymer component (B) is 0.08 or more and 0.50 or less provided that $W_A$ and $W_B$ total 1.0.

3 Claims, No Drawings

(56) References Cited

FOREIGN PATENT DOCUMENTS

| | | | |
|---|---|---|---|
| JP | 3179005 | A2 | 8/1991 |
| JP | 3179006 | A2 | 8/1991 |
| JP | 3207703 | A2 | 9/1991 |
| JP | 3207704 | A2 | 9/1991 |
| JP | 8269270 | A2 | 10/1996 |
| JP | 2005298642 | A2 | 10/2005 |
| JP | 2006233207 | A2 | 9/2006 |
| JP | 2007177168 | A2 | 7/2007 |
| JP | 2007197722 | A2 | 8/2007 |
| JP | 2008031385 | A2 | 2/2008 |
| JP | 2008031386 | A2 | 2/2008 |
| JP | 2009197225 | A2 | 9/2009 |
| JP | 2009197226 | A2 | 9/2009 |
| JP | 20111545 | | 1/2011 |
| WO | 8805792 | A1 | 8/1988 |
| WO | 8805793 | A1 | 8/1988 |
| WO | 2006080578 | A1 | 8/2006 |
| WO | 2007034920 | A1 | 3/2007 |
| WO | 2007094378 | A1 | 8/2007 |
| WO | 2008016059 | A1 | 2/2008 |

OTHER PUBLICATIONS

Zenjiro Osawa et al., Koubunshi no jumyou yosoku to choujumyouka gijutsu(Prediction of Polymer Life and Life Lengthening Technique), NTS Inc., 2002, pp. 480-481 and partial English translation thereof.; Cited in Specification.
Kagaku Ryouiki Zoukan vol. 141, NMR-Sousetsu to Jikken Guide [I]; pp. 132-133.; Cited in Specification.
C Gabriel, H.Munstedt, J.Rheol., 47(3), pp. 619-630 (2003).; Cited in Specification.
H. Munstedt, D. Auhl, J. Non-Newtonian Fluid Mech., 2005, 128, pp. 62-69.; Cited in Specification.
Kazuo Matsuura et al., Polyethylene Gijutsu Dokuhon(Polyethylene Technical Guidebook); Kogyo Chosakai Publishing Co., Ltd.: 2001; pp. 32-36 and partial English translation thereof.; Cited in Specification.
Walther Burchard, Advances in Polymer Science, Branched Polymer II, 1999, 143, pp. 136-137.; Cited in Specification.
R. Chiang, J. Polym. Sci., 36, (1959) pp. 91-103.; Cited in Specification.
R. Chiang, J. Polym. Sci., 28, (1958) pp. 235-238.; Cited in Specification.
A. S. Hoffman, B. A. Fries and P. C. Condit, J. Polym. Sci. Part C, 4, (1963) pp. 109-126.; Cited in Specification.
Extended European Search Report dated Jun. 13, 2016 issued in the corresponding European patent application No. 14754789.7.

* cited by examiner

BIAXIALLY-STRETCHED FILM AND ETHYLENE POLYMER COMPOSITION

TECHNICAL FIELD

The present invention relates to a biaxially-stretched film and an ethylene polymer composition. In more detail, the present invention relates to a biaxially-stretched film obtained from an ethylene polymer composition containing specific ethylene polymers at a specific ratio as well as the ethylene polymer composition.

BACKGROUND ART

An ethylene.α-olefin random copolymer, so-called linear low-density polyethylene (LLDPE), as compared with high-pressure low-density polyethylene, is excellent in properties such as transparency, stress-cracking resistance, low-temperature heat-sealability, heat-seal strength and impact resistance. With these features taken advantage of, it is widely used as a sealant for food packaging. In particular, LLDPE produced by polymerization by using a single-site catalyst is excellent also in transparency, low-temperature heat-sealability, impurity sealability and hot tack property.

Methods proposed to improve the properties of LLDPE films such as transparency and mechanical strength include a method in which films are biaxially-stretched under specific conditions (Patent Document 1); and a method in which a composition given by adding to LLDPE a high-density polyethylene or a high-pressure low-density polyethylene is biaxially-stretched to provide a shrink film (Patent Document 2).

Patent Document 3 discloses a biaxially-stretched film with excellent tear property composed of a composition given by adding, to LLDPE, a high-pressure low-density polyethylene or a high-density polyethylene.

On the other hand, regarding using for films a long-chain branching polyethylene produced by using a transition metal complex catalyst, Patent Document 4 discloses a film composed of a long-chain branching polyethylene; and Patent Document 5 discloses a film composed of a blend composition containing a long-chain branching polyethylene.

Patent Documents 6 and 7 disclose long-chain branching polyethylenes, which can be contained in the polyethylene composition of the present invention, as well as disclose polyethylene compositions containing the same and films formed thereof. However, these Documents of conventional techniques fail to mention that they can be used for biaxially-stretched films, and have no mention of specific compositions suitable for biaxially-stretched films.

CITATION LIST

Patent Literature

[Patent Document 1] JP-A-S58-90924
[Patent Document 2] JP-A-S57-181828
[Patent Document 3] JP-A-2005-298642
[Patent Document 4] JP-A-2007-177168
[Patent Document 5] JP-A-2007-197722
[Patent Document 6] JP-A-2006-233207
[Patent Document 7] JP-A-2008-31385

SUMMARY OF INVENTION

Technical Problem

Biaxially-stretched films formed from LLDPE obtained by such conventionally known methods as described above have a problem that they are inferior in thickness accuracy. Another problem is that temperature range in which stretching can be carried out without causing defects such as film hanging or film breakage likely to occur in biaxial stretching is narrow. That is, it has been difficult to obtain biaxially-stretched films with high thickness accuracy in a broad stretching temperature range.

It is an object of the present invention to provide a biaxially-stretched film wherein the biaxial stretching is possible in a broader temperature range and which is excellent in thickness accuracy, and an ethylene polymer composition serving as a raw material of the film.

Solution to Problem

The present inventors have earnestly studied in order to solve the above problems, and have found out that the above problems can be solved by a specific ethylene polymer composition, more particularly an ethylene polymer composition obtained by combining, at a specific ratio, an ethylene polymer component having substantially no long-chain branching with an ethylene polymer component having a large number of long-chain branching, thereby perfecting the present invention.

That is, the present invention concerns the following [1] to [6].

[1] A biaxially-stretched film obtained from an ethylene polymer composition (E) comprising an ethylene polymer component (A) fulfilling requirements described below and an ethylene polymer component (B) fulfilling requirements described below, wherein a weight fraction $[W_A]$ of the ethylene polymer component (A) is 0.50 or more and 0.92 or less, and a weight fraction $[W_B]$ of the ethylene polymer component (B) is 0.08 or more and 0.50 or less provided that $W_A$ and $W_B$ total 1.0, wherein the ethylene polymer component (A) comprises an ethylene polymer (a) described below at 20% by weight or more and 100% by weight or less and fulfills requirements (A-1) to (A-3) described below:

(A-1) Melt flow rate ($MFR_A$) at 190° C. under a load of 2.16 kg is not less than 0.01 g/10 min and not more than 10 g/10 min;

(A-2) Density ($D_A$) is 890 kg/m$^3$ or more and 940 kg/m$^3$ or less; and (A-3) Ratio $[\eta]/Mw^{0.776}$ of intrinsic viscosity measured in decalin at 135° C. [[η] (dl/g)] to weight average molecular weight measured by GPC-viscometry (GPC-VISCO) to the power 0.776 ($Mw^{0.776}$) is not less than $1.90 \times 10^{-4}$ and not more than $2.80 \times 10^{-4}$, and wherein the ethylene polymer component (B) is a copolymer of ethylene and an α-olefin having 4 to 10 carbon atoms and fulfills requirements (B-1) to (B-5) described below:

(B-1) Melt flow rate ($MFR_B$) at 190° C. under a load of 2.16 kg is not less than 0.01 g/10 min and not more than 30 g/10 min;

(B-2) Density ($D_B$) is 900 kg/m$^3$ or more and 939 kg/m$^3$ or less;

(B-3) Sum of the number of methyl branches [Me (/1000C)] and the number of ethyl branches [Et(/1000C)] per 1000 carbon atoms in $^{13}$C-NMR analysis [(Me+Et) (/1000C)] is not more than 1.80;

(B-4) Ratio $\eta_0/Mw^{6.8}$ of zero shear viscosity at 200° C. [$\eta_0$(P)] to weight average molecular weight measured by GPC-viscometry (GPC-VISCO) to the power 6.8 ($Mw^{6.8}$) is not less than $0.03 \times 10^{-30}$ and not more than $7.5 \times 10^{-30}$; and (B-5) Ratio $[\eta]/Mw^{0.776}$ of intrinsic viscosity measured in decalin at 135° C. $[[\eta]$ (dl/g)] to weight average molecular weight measured by GPC-viscometry (GPC-VISCO) to the power 0.776 ($Mw^{0.776}$) is not less than $0.90\times10^{-4}$ and not more than $1.65\times10^{-4}$, wherein the ethylene polymer (a) is a copolymer of ethylene and an α-olefin having 4 to 10 carbon atoms and fulfills requirements (a-1) to (a-3) described below:

(a-1) Melt flow rate ($MFR_a$) at 190° C. under a load of 2.16 kg is not less than 0.01 g/10 min and not more than 5.0 g/10 min.;

(a-2) Density ($D_a$) is 890 kg/m³ or more and 928 kg/m³ or less; and (a-3) $(D_B - D_a) \geq 1$ kg/m³.

[2] The biaxially-stretched film described in the above [1], wherein the ethylene polymer component (A) further comprises an ethylene polymer (c) at 20% by weight or more and 50% by weight or less, and the ethylene polymer (c) fulfills requirements described below but does not fall within the ethylene polymer (a), wherein the ethylene polymer (c) is a copolymer of ethylene and an α-olefin having 4 to 10 carbon atoms and fulfills requirements (c-1) to (c-4) described below:

(c-1) Melt flow rate ($MFR_c$) at 190° C. under a load of 2.16 kg is not less than 0.01 g/10 min and not more than 3000 g/10 min;

(c-2) $(MFR_c - MFR_a) \geq 1$ g/10 min;

(c-3) Density ($D_c$) is 900 kg/m³ or more and 940 kg/m³ or less; and (c-4) $(D_c - D_a) \geq 1$ kg/m³.

[3] The biaxially-stretched film described in the above [1] or [2], wherein the ethylene polymer component (A) further comprises an ethylene polymer (d) fulfilling requirements described below at 10% by weight or more and 50% by weight or less, wherein the ethylene polymer (d) is an ethylene homopolymer or a copolymer of ethylene and an α-olefin having 3 to 10 carbon atoms and fulfills requirements (d-1) and (d-2) described below:

(d-1) Melt flow rate ($MFR_d$) at 190° C. under a load of 2.16 kg is not less than 0.01 g/10 min and not more than 2 g/10 min.; and (d-2) Density ($D_d$) is more than 940 kg/m³ and 980 kg/m³ or less.

[4] An ethylene polymer composition comprising an ethylene polymer component (A) fulfilling requirements described below and an ethylene polymer component (B) fulfilling requirements described below, wherein a weight fraction [$W_A$] of the ethylene polymer component (A) is 0.50 or more and 0.92 or less, and a weight fraction [$W_B$] of the ethylene polymer component (B) is 0.08 or more and 0.50 or less, provided that $W_A$ and $W_B$ total 1.0, wherein the ethylene polymer component (A) comprises an ethylene polymer (a) described below at 20% by weight or more and 100% by weight or less and fulfills requirements (A-1) to (A-3) described below:

(A-1) Melt flow rate ($MFR_A$) at 190° C. under a load of 2.16 kg is not less than 0.01 g/10 min and not more than 10 g/10 min.;

(A-2) Density ($D_A$) is 890 kg/m³ or more and 940 kg/m³ or less; and (A-3) Ratio $[\eta]/Mw^{0.776}$ of intrinsic viscosity measured in decalin at 135° C. $[[\eta]$ (dl/g)] to weight average molecular weight measured by GPC-viscometry (GPC-VISCO) to the power 0.776 ($Mw^{0.776}$) is not less than $1.90\times10^{-4}$ and not more than $2.80\times10^{-4}$, wherein the ethylene polymer component (B) is a copolymer of ethylene and an α-olefin having 4 to 10 carbon atoms, and fulfills requirements (B-1) to (B-5) described below:

(B-1) Melt flow rate ($MFR_B$) at 190° C. under a load of 2.16 kg is not less than 0.01 g/10 min and not more than 30 g/10 min;

(B-2) Density ($D_B$) is 900 kg/m³ or more and 939 kg/m³ or less;

(B-3) Sum of the number of methyl branches [Me (/1000C)] and the number of ethyl branches [Et(/1000C)] per 1000 carbon atoms in $^{13}$C-NMR analysis [(Me+Et) (/1000C)] is not more than 1.80;

(B-4) Ratio $\eta_0/Mw^{6.8}$ of zero shear viscosity at 200° C. [$\eta_0$(P)] to weight average molecular weight measured by GPC-viscometry (GPC-VISCO) to the power 6.8 ($Mw^{6.8}$) is not less than $0.03\times10^{-30}$ and not more than $7.5\times10^{-30}$; and (B-5) Ratio $[\eta]/Mw^{0.776}$ of intrinsic viscosity measured in decalin at 135° C. $[[\eta]$ (dl/g)] to weight average molecular weight measured by GPC-viscometry (GPC-VISCO) to the power 0.776 ($Mw^{0.776}$) is not less than $0.90\times10^{-4}$ and not more than $1.65\times10^{-4}$, wherein the ethylene polymer (a) is a copolymer of ethylene and an α-olefin having 4 to 10 carbon atoms, and fulfills requirements (a-1) to (a-3) described below:

(a-1) Melt flow rate ($MFR_a$) at 190° C. under a load of 2.16 kg is not less than 0.01 g/10 min and not more than 5.0 g/10 min;

(a-2) Density ($D_a$) is 890 kg/m³ or more and 928 kg/m³ or less; and (a-3) $(D_B - D_a)$ 1 kg/m³.

[5] The ethylene polymer composition described in the above [4], wherein the ethylene polymer component (A) further comprises an ethylene polymer (c) which fulfills requirements described below but does not fall within the ethylene polymer (a), at 20% by weight or more and 50% by weight or less, wherein the ethylene polymer (c) is a copolymer of ethylene and an α-olefin having 4 to 10 carbon atoms, and fulfills requirements (c-1) to (c-4) described below:

(c-1) Melt flow rate ($MFR_c$) at 190° C. under a load of 2.16 kg is not less than 0.01 g/10 min and not more than 3000 g/10 min.;

(c-2) $(MFR_c - MFR_a) \geq 1$ g/10 min;

(c-3) Density ($D_c$) is 900 kg/m³ or more and 940 kg/m³ or less; and (c-4) $(D_c - D_a) \geq 1$ kg/m³.

[6] The ethylene polymer composition described in the above [4] or [5], wherein the ethylene polymer component (A) further comprises an ethylene polymer (d) fulfilling requirements described below at 10% by weight or more and 50% by weight or less, wherein the ethylene polymer (d) is an ethylene homopolymer or a copolymer of ethylene and an α-olefin having 3 to 10 carbon atoms, and fulfills requirements (d-1) and (d-2) described below:

(d-1) Melt flow rate ($MFR_d$) at 190° C. under a load of 2.16 kg is not less than 0.01 g/10 min and not more than 2 g/10 min; and (d-2) Density ($D_d$) is more than 940 kg/m³ and 980 kg/m³ or less.

Effects of Invention

According to the present invention, a biaxially-stretched film excellent in thickness accuracy can be obtained in a broad stretching temperature range.

DESCRIPTION OF EMBODIMENTS

Hereinafter, the biaxially-stretched films and the ethylene polymer compositions according to the present invention will be specifically described.

[Ethylene Polymer Composition (E)]

The ethylene polymer composition (E) of the present invention comprises the ethylene polymer component (A) and the ethylene polymer component (B), wherein a weight fraction [$W_A$] of the ethylene polymer component (A) is 0.50 or more and 0.92 or less, and a weight fraction [$W_B$] of the ethylene polymer component (B) is 0.08 or more and 0.50 or less, provided that $W_A$ and $W_B$ total 1.0.

A lower limit of $W_A$ is preferably 0.55 and more preferably 0.60; and an upper limit thereof is preferably 0.85 and more preferably 0.80. A lower limit of $W_B$ is preferably 0.15 and more preferably 0.20; and an upper limit thereof is preferably 0.45 and more preferably 0.40.

$W_B$ being not less than the above-mentioned lower limit reinforces entanglements of molecular chains formed between the ethylene polymer component (A) and the ethylene polymer component (B), which is preferred in terms of thickness accuracy, for reasons set forth later; and improves melt tension, enabling stretching in a broader temperature range with film hanging being prevented. $W_B$ being not more than the above-mentioned upper limit prevents a raw fabric from having an unnecessarily high viscosity, enabling stretching in a broader temperature range with film breakage being prevented and enabling uniform stretching to provide good thickness accuracy.

As described above, the ethylene polymer composition (E) according to the present invention needs to contain the ethylene polymer component (A) and the ethylene polymer component (B) at the specific ratio, while whether the composition further contains other components is not particularly limited. For example, the ethylene polymer composition (E) according to the present invention may be substantially composed of the ethylene polymer component (B) and the ethylene polymer component (A) alone; however, the ethylene polymer composition (E) according to the present invention is not limited to an ethylene polymer composition consisting only of the ethylene polymer component (B) and the ethylene polymer component (A), but also may be an ethylene polymer composition that contains the ethylene polymer component (B) and the ethylene polymer component (A) and in addition thereto contains a thermoplastic resin which is neither the ethylene polymer component (B) nor the ethylene polymer component (A) (hereinafter "other thermoplastic resin").

The ethylene polymer composition (E) may further comprise "other component" which will be described later, either instead of "other thermoplastic resin" or together with "other thermoplastic resin".

The ethylene polymer component (B) and the ethylene polymer component (A), constituents of the ethylene polymer composition (E), will now be described.

<Ethylene Polymer Component (B)>

The ethylene polymer composition (E) according to the present invention comprises the ethylene polymer component (B). In the present invention, the ethylene polymer component (B) is used as an ethylene polymer component having a large number of long-chain branching, as will be described later.

The ethylene polymer component (B) is a copolymer of ethylene and an α-olefin having 4 to 10 carbon atoms, and preferably a copolymer of ethylene and an α-olefin having 6 to 10 carbon atoms. If α-olefin having 4 carbon atoms is used as the "α-olefin having 4 to 10 carbon atoms", it is preferred that α-olefin having 4 carbon atoms be used together with an α-olefin having 6 to 10 carbon atoms.

In the ethylene polymer component (B), the α-olefins having 4 to 10 carbon atoms to be used for copolymerization with ethylene include, for example, 1-butene, 1-hexene, 4-methyl-1-pentene, 1-octene and 1-decene.

The ethylene polymer component (B) may contain "other component" which will be described later in a small amount without departing from the object of the present invention. Thus, embodiments of constituents of the ethylene polymer component (B) are for example as follows:

an ethylene polymer component (B1) composed of only a copolymer of ethylene and an α-olefin having 4 to 10 carbon atoms; and an ethylene polymer component (B1') composed of a copolymer of ethylene and an α-olefin having 4 to 10 carbon atoms as well as "other component" which will be described later.

The ethylene polymer component (B) has properties shown by the following requirements (B-1) to (B-5).

(B-1) Melt flow rate ($MFR_B$) at 190° C. under a load of 2.16 kg is not less than 0.01 g/10 min and not more than 30 g/10 min.

A lower limit of the melt flow rate ($MFR_B$) is preferably 0.1 g/10 min, more preferably 0.5 g/10 min and particularly preferably 1.0 g/10 min; and an upper limit thereof is preferably 20 g/10 min and more preferably 7.0 g/10 min.

The melt flow rate ($MFR_B$) being not less than the above-mentioned lower limit prevents the ethylene polymer composition (E) from having unnecessarily high shear viscosity and elongational viscosity thereby allowing the composition to have a good formability. The melt flow rate ($MFR_B$) being not more than the above-mentioned upper limit allows the biaxially-stretched film to have improved thickness accuracy as well as improved mechanical strength such as tensile strength and heat seal strength.

Melt flow rate (MFR) strongly depends on a molecular weight; the smaller the melt flow rate (MFR) is, the larger the molecular weight is, and the larger the melt flow rate (MFR) is, the smaller the molecular weight is. It is known that the molecular weight of an ethylene polymer is determined by a composition ratio of hydrogen to ethylene (hydrogen/ethylene) in a polymerization system (for instance, Kazuo Soga et al., Catalytic Olefin Polymerization; Kodansha Scientific Ltd.: 1990; p. 376). Hence, the melt flow rate ($MFR_B$) of the ethylene polymer component (B) can be changed by changing the composition ratio of hydrogen/ethylene. Melt flow rate can be adjusted in the same manner also for polymer components constituting the ethylene polymer component (A) which will be described later, such as the ethylene polymer (a) which will be described later.

Melt flow rates (MFR), not just the melt flow rate ($MFR_B$) but also melt flow rate ($MFR_A$), melt flow rate ($MFR_a$), melt flow rate ($MFR_a$) and melt flow rate ($MFR_d$) that will be described later, are measured at 190° C. under a load of 2.16 kg in accordance with ASTM D 1238-89.

(B-2) Density ($D_B$) is not less than 900 kg/m³ and not more than 939 kg/m³. A lower limit of the density ($D_B$) is preferably 910 kg/m³ and more preferably 915 kg/m³; and an upper limit is preferably 935 kg/m³ and more preferably 930 kg/m³.

The density ($D_B$) being not less than the lower limit allows the film formed of the ethylene polymer composition (E) to have less sticky surface and to have an excellent blocking resistance. The density ($D_B$) being not more than the upper limit allows the biaxially-stretched film to have improved thickness accuracy, improved impact resistance and improved mechanical strength such as heat seal strength and resistance to breakage.

The density depends on the α-olefin content in the ethylene polymer; the lower the α-olefin content is, the higher the density is, and the higher the α-olefin content is, the lower the density is. It is known that the α-olefin content in the ethylene polymer is determined on the basis of the composition ratio of α-olefin to ethylene (α-olefin/ethylene) in a polymerization system (for example, Walter Kaminsky, *Makromol. Chem.* 193; 1992; p. 606). Hence, changing the composition ratio of α-olefin/ethylene enables production of an ethylene polymer having a density that satisfies the above-mentioned range. Density can be adjusted in the same manner also for polymer components constituting the ethylene polymer component (A) which will be described later, such as the ethylene polymer (a) which will be described later.

Measurement of the density, not just the density ($D_B$) but also density ($D_A$), density ($D_a$), density ($D_c$) and density ($D_d$), which will be described later, is conducted as follows: a measurement sample is heat-treated at 120° C. for 1 hour, and gradually cooled linearly to room temperature over a period of 1 hour, and the resultant sample is subjected to measurement using a density gradient tube.

(B-3) Sum of the number of methyl branches [Me(/1000C)] and the number of ethyl branches [Et(/1000C)] per 1000 carbon atoms in $^{13}$C-NMR analysis [(Me+Et)(/1000C)] is not more than 1.80, preferably not more than 1.30, more preferably not more than 0.80, and further preferably not more than 0.50.

The number of methyl branches and the number of ethyl branches are herein each defined as the number per 1000 carbon atoms as described below, unless otherwise noted.

It is known that, if short-chain branching such as methyl branching and ethyl branching is present in an ethylene polymer, the short-chain branching is incorporated into the crystal, and thus interplanar spacing of the crystal is increased with the result that the mechanical strength of resin is reduced (for instance, Zenjiro Osawa et al., *Koubunshi no Jumyou Yosoku to Choujumyouka Gijutsu*; NTS Inc.: 2002; p. 481). Hence, when the sum of the number of methyl branches and the number of ethyl branches per 1000 carbons [(Me+Et) (/1000C)] is not more than the above upper limit, the ethylene polymer composition (E) and the resulting biaxially-stretched film have a good mechanical strength.

In general, the number of methyl branches and the number of ethyl branches in an ethylene polymer strongly depend on a polymerization process of the ethylene polymer, and the number of methyl branches and the number ethyl branches are larger in an ethylene polymer produced through high pressure radical polymerization than in an ethylene polymer produced through coordination polymerization involving use of a Ziegler catalyst. In coordination polymerization, the number of methyl branches and the number of ethyl branches in an ethylene polymer strongly depend on a composition ratio of propylene to ethylene and a composition ratio of 1-butene to ethylene in a polymerization system (propylene/ethylene and 1-butene/ethylene). Hence, changing the composition ratio of 1-butene/ethylene enables adjustment of the sum of the number of methyl branches and the number of ethyl branches per 1000 carbons [(Me+Et) (/1000C)] in an ethylene polymer.

The number of methyl branches and the number of ethyl branches are determined as follows in $^{13}$C-NMR analysis. The analysis is carried out with a nuclear magnetic resonance apparatus ECP500 ($^1$H: 500 MHz) manufactured by JEOL Ltd. at integration from 10000 times to 30000 times. The peak of the main chain methylene (29.97 ppm) is employed as the chemical shift reference. Into a commercially available quartz glass tube used for NMR analysis and having a diameter of 10 mm, 250 to 400 mg of a sample and 3 ml of a 5:1 (volume ratio) mixed solution of special grade o-dichlorobenzene manufactured by Wako Pure Chemical Industries, Ltd. and benzene-d6 manufactured by ISOTEC are put, and the content is heated at 120° C. and uniformly dispersed. Absorption in a NMR spectrum is assigned in accordance with Kagaku Ryouiki Zoukan vol. 141 *NMR-Sousetsu to Jikken Guide [I]*; p. 132 to 133. In particular, the number of methyl branches per 1000 carbon atoms, namely, the number of methyl branches per 1000 carbon atoms constituting the polymer chain of an ethylene polymer is calculated from an integrated intensity ratio of absorption of methyl groups derived from the methyl branching (19.9 ppm) to the integral sum of absorption observed in the range of 5 to 45 ppm. The number of ethyl branches is calculated from an integrated intensity ratio of absorption of ethyl groups derived from the ethyl branches (10.8 ppm) to the integral sum of absorption observed in the range of 5 to 45 ppm.

Descriptions provided above for the "number of methyl branches" and the "number of ethyl branches" similarly apply not only to the ethylene polymer component (B), but also to the ethylene polymer component (A) which will be described later.

(B-4) Ratio $\eta_0/Mw^{6.8}$ of zero shear viscosity at 200° C. [$\eta_0(P)$] to weight average molecular weight measured by GPC-viscometry (GPC-VISCO) to the power 6.8 ($Mw^{6.8}$) is not less than $0.03\times10^{-30}$ and not more than $7.5\times10^{-30}$.

That is, in particular, in the ethylene polymer component (B) used in the present invention, $\eta_0$ and Mw fulfill Equation (Eq-1).

$$0.03\times10^{-30} \leq \eta_0/Mw^{6.8} \leq 7.5\times10^{-30} \quad \text{(Eq-1)}$$

The lower limit is preferably $0.05\times10^{-30}$, and more preferably $0.8\times10^{-30}$; and the upper limit is preferably $5.0\times10^{-30}$, and more preferably $3.0\times10^{-30}$.

Allowing $\eta_0/Mw^{6.8}$ to be not less than $0.03\times10^{-30}$ and not more than $7.5\times10^{-30}$ is equivalent to that, in double logarithmic plot of $\eta_0$ and Mw, log ($\eta_0$) and log Mw are in a region defined by Equation (Eq-1').

$$6.8 \text{ Log(Mw)}-31.523 \leq \text{Log}(\eta_0) \leq 6.8 \text{ Log(Mw)}-29.125 \quad \text{(Eq-1')}$$

In double logarithmic plot of zero shear viscosity [$\eta_0(P)$] to weight average molecular weight (Mw), an ethylene polymer which has no long-chain branching but has a linear structure and which does not exhibit strain hardening in elongation viscosity follows a power law with a slope of 3.4. On the other hand, it is known that an ethylene polymer which has a large number of relatively short long-chain branching and which exhibits strain rate hardening in elongation viscosity has a zero shear viscosity [$\eta_0(P)$] smaller than a value obtained by a power law and that the slope thereof is greater than 3.4 (C. Gabriel; H. Munstedt, *J. Rheol.*, 47(3); 2003; 619 and H. Munstedt; D. Auhl, *J. Non-Newtonian Fluid Mech.*; 2005; 128 and 62-69), and a slope of 6.8 can be empirically employed. Determining a ratio of $\eta_0$ to $Mw^{6.8}$ is disclosed also in JP-A-2011-1545.

When the zero shear viscosity [$\eta_0(P)$] of the ethylene polymer component (B) at 200° C. is not more than $20\times10^{-13}\times Mw^{6.8}$, uniform stretching is made possible by strain hardening or strain rate hardening in the ethylene polymer composition (E).

It is believed that the relationship between zero shear viscosity [$\eta_0(P)$] and weight average molecular weight (Mw) depends on the amount and length of long-chain branching contained in an ethylene polymer. In particular, the larger the amount of long-chain branching is, or the shorter the length of the long-chain branching is, the more [$\eta_0/Mw^{6.8}$] approaches the claimed lower limit; the smaller the amount of long-chain branching is, or the longer the length of the long-chain branching is, the more [$\eta_0/Mw^{6.8}$] approaches the claimed upper limit.

That is, it is believed that if [$\eta_0/Mw^{6.8}$] is more than the upper limit, the number of long-chain branching tends to be insufficient, and that if [$\eta_0/Mw^{6.8}$] is less than the lower limit, the length of long-chain branching tends to be insufficient.

The "long-chain branching" is herein defined as a branched structure having a length greater than or equal to the entanglement molecular weight (Me) in an ethylene polymer. It is known that introduction of such long-chain branching enables significant changes in the melting properties and forming processability of the ethylene polymer (for instance, Kazuo Matsuura et al., *Polyethylene Gijutsu Dokuhon*; Kogyo Chosakai Publishing Co., Ltd.: 2001; p. 32 and 36). As described below, the ethylene polymer component (B) according to the present invention can be produced, for example, through polymerization of ethylene and an α-olefin having 4 to 10 carbon atoms in the presence of an olefin polymerization catalyst which contains components (CA), (CB), and (CC) and which will be described in "Catalyst for Producing Ethylene Polymer Component (B)".

The inventors presume that long-chain branching is more favorably generated in the ethylene polymer component (B) through the following process in the synthetic mechanism of the ethylene polymer of the present invention: ethylene and an α-olefin having 4 to 10 carbon atoms are copolymerized in the presence of an olefin polymerization catalyst component containing the components (CA) and (CC) and optionally a solid support (S) which will be described later in "Catalyst for Producing Ethylene Polymer Component (B)" to give a "macromonomer", which is a polymer having a number average molecular weight ranging from not less than 4000 to not more than 20000, preferably not less than 4000 to not more than 15000, and having a vinyl group at an end thereof; and then copolymerization of the macromonomer is carried out with the aid of an olefin polymerization catalyst component containing the components (CB) and (CC) and optionally a solid support (S) so as to be competitive to the polymerization of ethylene and an α-olefin having 4 to 10 carbon atoms.

The higher a composition ratio of the macromonomer to ethylene ([macromonomer]/[ethylene]) in a polymerization system is, the larger the long-chain branching content is. Increasing the ratio of the component (CA) in the olefin polymerization catalyst, that is, a molar ratio ([A]/[A+B]) of the component (CA) to the sum of the components (CA) and (CB) enables the composition ratio [macromonomer]/[ethylene] to be enhanced; hence, increasing the molar ratio ([A]/[A+B]) leads to an enhancement in the long-chain branching content. Increasing a composition ratio of hydrogen to ethylene (hydrogen/ethylene) in a polymerization system enables the molecular weight of the macromonomer to be reduced, so that the length of the long-chain branching to be introduced into the ethylene polymer is decreased.

Accordingly, changing the ratios [A]/[A+B] and hydrogen/ethylene enables production of an ethylene polymer having $\eta_0/Mw^{6.8}$ that satisfies the above-mentioned range.

Moreover, polymerization conditions for controlling the long-chain branching content are disclosed in, for example, WO 2007/034920.

The zero shear viscosity at 200° C. [$\eta_0(P)$] is determined as follows. The angular velocity [$\omega$(rad/sec)] variance of shear viscosity at a measurement temperature of 200° C. ($\eta^*$) is measured in the range of $0.02512 \leq \omega \leq 100$. For the measurement, Dynamic Stress Rheometer SR-5000, manufactured by Rheometric Scientific, is used. A parallel plate having a size of 25 mm in diameter is used as a sample holder, and the thickness of a sample is approximately 2.0 mm. The measurement is carried out at five points per digit of w. The strain amount is appropriately selected from the range of 3 to 10% so as to enable detection of torque in the measurement range and so as to avoid torque over. The sample used in the measurement of shear viscosity is prepared by press-forming with a press-forming machine manufactured by SHINTO Metal Industries Corporation under the following conditions so as to have a thickness of 2 mm: preheating temperature of 190° C., preheating time of 5 minutes, heating temperature of 190° C., heating time of 2 minutes, heating pressure of 100 kgf/cm², cooling temperature of 20° C., cooling time of 5 minutes, and cooling pressure of 100 kgf/cm².

Zero shear viscosity $\eta_0$ can be calculated by fitting the Carreau model represented by Equation (Eq-2) below to an actually obtained rheological curve [angular velocity (w) variance of shear viscosity ($\eta^*$)] by a nonlinear least-squares method.

$$\eta^* = \eta_0[1+(\lambda\omega)^a]^{(n-1)/a} \qquad (\text{Eq-2})$$

wherein $\lambda$ represents a parameter with a dimension of time, and n represents a power law index of a material. The fitting by a nonlinear least-squares method is carried out such that d in Equation (Eq-3) below is minimized.

[Math. 1]

$$d = \sum_{\omega=0.02512}^{100} [\mathrm{Log}_{10}\eta_{exp}(\omega) - \mathrm{Log}_{10}\eta_{calc}(\omega)]^2 \qquad (\text{Eq-3})$$

wherein $\eta_{exp}(\omega)$ represents actually measured shear viscosity, and $\eta_{calc}(\omega)$ represents shear viscosity calculated from the Carreau model.

A weight average molecular weight (Mw) is measured as follows by GPC-viscometry with GPC/V2000 manufactured by Waters Corporation. A guard column to be used is a Shodex AT-G, and analytical columns to be used are two AT-806 columns. A column temperature is 145° C., a mobile phase to be used is o-dichlorobenzene containing 0.3% by weight of BHT as an antioxidant, a flow rate is 1.0 ml/min, and a sample concentration is 0.1% by weight. Detectors to be used are a differential refractometer and a three-capillary viscometer. Standard polystyrene to be used is manufactured by TOSOH CORPORATION. In calculation of molecular weight, an actual viscosity is calculated with the viscometer and the refractometer, and a weight average molecular weight (Mw) is calculated by universal calibration based on the actual viscosity.

(B-5) Ratio [$\eta$]/Mw$^{0.776}$ of intrinsic viscosity measured in decalin at 135° C. [[$\eta$] (dl/g)] to weight average molecular weight measured by GPC-viscometry (GPC-VISCO) to the power 0.776 (Mw$^{0.776}$) is not less than $0.90 \times 10^{-4}$ and not more than $1.65 \times 10^{-4}$. Specifically, in the ethylene polymer component (B) used in the present invention, [η] and Mw fulfill Equation (Eq-4).

$$0.90 \times 10^{-4} \leq [\eta]/Mw^{0.776} \leq 1.65 \times 10^{-4} \quad \text{(Eq-4)}$$

The lower limit is preferably $0.95 \times 10^{-4}$, and more preferably $1.00 \times 10^{-4}$; and the upper limit is preferably $1.55 \times 10^{-4}$, and more preferably $1.45 \times 10^{-4}$.

Allowing $[\eta]/Mw^{0.776}$ to be not less than $0.90 \times 10^{-4}$ and not more than $1.65 \times 10^{-4}$ is equivalent to that, in double logarithmic plot of [η] and Mw, log ([η]) and log (Mw) are in a region defined by Equation (Eq-4') below.

$$0.776 \text{ Log}(Mw) - 4.046 \leq \text{Log}([\eta]) \leq 0.776 \text{ Log}(Mw) - 3.783 \quad \text{(Eq-4')}$$

It is known that introducing long-chain branching into an ethylene polymer enables the intrinsic viscosity [η] (dl/g) to be small relative to the molecular weight thereof as compared with a linear ethylene polymer having no long-chain branching (for example, Walther Burchard, ADVANCES IN POLYMER SCIENCE, 143, *Branched Polymer II*, p. 137 (1999)).

There has been a report in which, in accordance with the Mark-Houwink-Sakurada equation, the [η] of polyethylene is in proportion to My to the power 0.7, the [η] of polypropylene is in proportion to Mw to the power 0.80, and the [η] of poly-4-methyl-1-pentene is in proportion to Mn to the power 0.81 (for instance, R. Chiang, *J. Polym. Sci.*, 36, 91 (1959): P. 94, R. Chiang, *J. Polym. Sci.*, 28, 235 (1958): P. 237, A. S. Hoffman, B. A. Fries and P. C. Condit, *J. Polym. Sci. Part C*, 4, 109 (1963): P. 119 FIG. 4).

The Mw to the power 0.776 is determined as a representative index of the copolymer of ethylene and an α-olefin having 4 to 10 carbon atoms, and the requirement (B-5) specifies that the [η] of this copolymer is small relative to the molecular weight thereof as compared with conventional ethylene polymers; this approach is disclosed in WO 2006/080578.

Hence, when the $[\eta]/Mw^{0.776}$ of the ethylene polymer component (B) is not more than the above-mentioned upper limit, especially not more than $1.65 \times 10^{-4}$, the ethylene polymer component (B) has a large number of long-chain branching, which enables the ethylene polymer composition (E) to have an excellent formability and fluidity.

Since increasing the ratio of the component (CA) contained in the olefin polymerization catalyst ([A]/[A+B]) leads to an increase in the long-chain branching content as described above, changing the ratio [A]/[A+B] enables production of the ethylene polymer component (B) having the claimed intrinsic viscosity [η].

The intrinsic viscosity [η] (dl/g) was measured using a decalin solvent in the following manners. Approximately 20 mg of a sample is dissolved in 15 ml of decalin, and specific viscosity $\eta_{sp}$ is measured in an oil bath at 135° C. Then, 5 ml of a decalin solvent is further added to the decalin solution for dilution, and specific viscosity $\eta_{sp}$ thereof is measured in the same manner. This dilution is further repeated twice, and the value of $\eta_{sp}/C$ obtained by extrapolation of concentration (C) to 0 is determined as the intrinsic viscosity [η] (see Equation (Eq-5) below).

$$[\eta] = \lim (\eta_{sp}/C)(C \to 0) \quad \text{(Eq-5)}$$

<Process for Producing Ethylene Polymer Component (B)>

The ethylene polymer component (B) used in the present invention can be produced through polymerization of ethylene and an α-olefin having 4 to 10 carbon atoms in the presence of a catalyst for producing ethylene polymer which will be described later.

In the present invention, liquid-phase polymerization, such as melt polymerization or suspension polymerization, or vapor-phase polymerization can be employed, and suspension polymerization and vapor-phase polymerization are preferably used.

Specific examples of inert hydrocarbon media usable in the liquid-phase polymerization include aliphatic hydrocarbons such as propane, butane, pentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; halogenated hydrocarbons such as ethylene chloride, chlorobenzene, and dichloromethane; and mixtures thereof. Furthermore, the α-olefin itself can be also used as a solvent.

Catalyst for Producing Ethylene Polymer Component (B)

The ethylene polymer component (B) used in the present invention can be efficiently produced through polymerization of ethylene and an α-olefin having 4 to 10 carbon atoms in the presence of a catalyst containing the components (CA), (CB), and (CC).

The catalyst for producing the ethylene polymer component (B), which is used in the present invention, may include a solid support (S) and a component (G) in addition to the components (CA), (CB), and (CC), which will be described later.

Each component contained in the olefin polymerization catalyst will now be described.

Component (CA)

The component (CA) usable in the present invention is a bridged metallocene compound represented by Formula (I) below.

[Chem. 1]

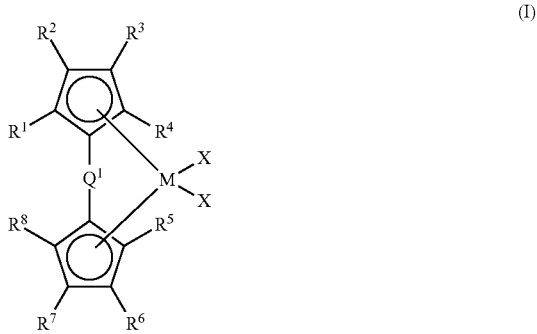

In Formula (I), M represents a transition metal atom belonging to Group 4 on the periodic table; in particular, M represents a transition metal atom selected from titanium, zirconium, and hafnium and is preferably zirconium.

$R^1$ to $R^8$ are selected from a hydrogen atom, hydrocarbon groups having 1 to 20 carbon atoms, halogen-containing groups, oxygen-containing groups, nitrogen-containing groups, boron-containing groups, sulfur-containing groups, phosphorus-containing groups, silicon-containing groups, germanium-containing groups, and tin-containing groups and may be the same as or different from each other; however, not all of them are hydrogen atoms. Adjoining groups of $R^1$ to $R^8$ may be connected to each other to form an aliphatic ring.

Examples of the hydrocarbon group include an alkyl group, a cycloalkyl group, an alkenyl group, an aryl group, and an arylalkyl group. Examples of the alkyl group include a methyl group, an ethyl group, an n-propyl group, an isopropyl group, an n-butyl group, an isobutyl group, an s-butyl group, a t-butyl group, an n-pentyl group, a neopentyl group, an n-hexyl group, an n-octyl group, a nonyl group, a dodecyl group, and an eicosyl group. Examples of the cycloalkyl group include a cyclopropyl group, a cyclobutyl group, a cyclopentyl group, a cyclohexyl group, a norbornyl group, and an adamantyl group. Examples of the alkenyl group include a vinyl group, a propenyl group, and a cyclohexenyl group. Examples of the aryl group include phenyl, tolyl, dimethylphenyl, trimethylphenyl, ethylphenyl, propylphenyl, biphenyl, α- or β-naphthyl, methylnaphthyl, anthracenyl, phenanthryl, benzylphenyl, pyrenyl, acenaphthyl, phenalenyl, aceanthrylenyl, tetrahydronaphthyl, indanyl, and biphenylyl. Examples of the arylalkyl group include benzyl, phenylethyl and phenylpropyl.

It is preferred that $R^1$ to $R^8$ moieties be selected from a hydrogen atom and an alkyl group having 1 to 15 carbon atoms, it is more preferred that at least six of $R^1$ to $R^8$ moieties be hydrogen atoms, and it is especially preferred that seven of $R^1$ to $R^8$ moieties be hydrogen atoms and that the rest be an alkyl group having 3 to 15 carbon atoms.

$Q^1$ is a divalent group that serves to connect two ligands to each other and selected from hydrocarbon groups having 1 to 20 carbon atoms such as alkylene groups, substituted alkylene groups, and alkylidene groups; halogen-containing groups; silicon-containing groups; germanium-containing groups; and tin-containing groups; in particular, silicon-containing groups are preferred.

Specific examples of the alkylene groups, substituted alkylene groups, and alkylidene groups include alkylene groups such as methylene, ethylene, propylene, and butylene; substituted alkylene group such as isopropylidene, diethylmethylene, dipropylmethylene, diisopropylmethylene, dibutylmethylene, methylethylmethylene, methylbutylmethylene, methyl-t-butylmethylene, dihexylmethylene, dicyclohexylmethylene, methylcyclohexylmethylene, methylphenylmethylene, diphenylmethylene, ditolylmethylene, methylnaphthylmethylene, dinaphthylmethylene, 1-methylethylene, 1,2-dimethylethylene, and 1-ethyl-2-methylethylene; and cycloalkylidene groups, such as cyclopropylidene, cyclobutylidene, cyclopentylidene, cyclohexylidene, cycloheptylidene, bicyclo[3.3.1]nonylidene, norbornylidene, adamantylidene, tetrahydronaphthylidene, and dihydroindanylidene, and alkylidene groups such as ethylidene, propylidene and butylidene.

Examples of the silicon-containing groups include silylene, methylsilylene, dimethylsilylene, diisopropylsilylene, dibutylsilylene, methylbutylsilylene, methyl-t-butylsilylene, dicyclohexylsilylene, methylcyclohexylsilylene, methylphenylsilylene, diphenylsilylene, ditolylsilylene, methylnaphthylsilylene, dinaphthylsilylene, cyclodimethylenesilylene, cyclotrimethylenesilylene, cyclotetramethylenesilylene, cyclopentamethylenesilylene, cyclohexamethylenesilylene, and cycloheptamethylenesilylene. In particular, dialkylsilylene groups such as a dimethylsilylene group and a dibutylsilylene group are preferred.

Xs are each independently an atom or group selected from a hydrogen atom, a halogen atom, a hydrocarbon group, a halogen-containing hydrocarbon group, a silicon-containing group, an oxygen-containing group, a sulfur-containing group, a nitrogen-containing group, and a phosphorus-containing group and preferably a halogen atom or a hydrocarbon group. Examples of the halogen atom include fluorine, chlorine, bromine, and iodine; in particular, chlorine is preferred. Examples of the hydrocarbon group include the same hydrocarbon groups as specified for $R^1$ to $R^8$; in particular, an alkyl group having 1 to 20 carbon atoms is especially preferred.

Specific examples of preferred compounds used as the component (CA) represented by Formula (I) include dimethylsilylenebis(cyclopentadienyl)zirconium dichloride, dimethylsilylenebis(2-methylcyclopentadienyl)zirconium dichloride, dimethylsilylenebis(3-methylcyclopentadienyl) zirconium dichloride, dimethylsilylenebis(3-n-butylcyclopentadienyl)zirconium dichloride, dimethylsilylene(cyclopentadienyl) (3-ethylcyclopentadienyl)zirconium dichloride, dimethylsilylene(cyclopentadienyl) (3-n-propylcyclopentadienyl) zirconium dichloride, dimethylsilylene (cyclopentadienyl) (3-n-butylcyclopentadienyl) zirconium dichloride, dimethylsilylene(cyclopentadienyl) (3-n-octylcyclopentadienyl) zirconium dichloride, dibutylsilylene(cyclopentadienyl)(3-n-propylcyclopentadienyl) zirconium dichloride, dimethylsilylene(cyclopentadienyl) (3-n-butylcyclopentadienyl) zirconium dichloride, dimethylsilylene (cyclopentadienyl) (3-n-octylcyclopentadienyl) zirconium dichloride, trifluoromethylbutylsilylene(cyclopentadienyl) (3-n-propylcyclopentadienyl)zirconium dichloride, trifluoromethylbutylsilylene(cyclopentadienyl)(3-n-butylcyclopentadienyl)zirconium dichloride, and trifluoromethylbutylsilylene(cyclopentadienyl)(3-n-octylcyclopentadienyl)zirconium dichloride; specific examples of a more preferred compound include dimethylsilylene (cyclopentadienyl) (3-n-propylcyclopentadienyl) zirconium dichloride and dimethylsilylene(3-n-butylcyclopentadienyl) (cyclopentadienyl) zirconium dichloride.

Component (CB)

The component (CB) usable in the present invention is a bridged metallocene compound represented by Formula (II) below.

[Chem. 2]

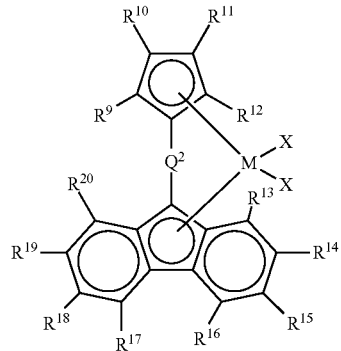

(II)

In Formula (II), M represents a transition metal atom belonging to Group 4 on the periodic table; in particular, M represents a transition metal atom selected from titanium, zirconium, and hafnium and is preferably zirconium.

$R^9$ to $R^{20}$ are selected from a hydrogen atom, hydrocarbon groups, halogen-containing groups, oxygen-containing groups, nitrogen-containing groups, boron-containing groups, sulfur-containing groups, phosphorus-containing groups, silicon-containing groups, germanium-containing groups, and tin-containing groups and may be the same as or different from each other, and adjoining two groups of them may be connected to each other to form a ring. It is preferred that $R^9$ to $R^{20}$ moieties be selected from a hydrogen atom and a hydrocarbon group, and it is more preferred that $R^9$ to $R^{12}$ each be a hydrogen atom and that $R^{19}$ to $R^{20}$ each be a hydrogen atom or an alkyl group having 1 to 20 carbon atoms.

$Q^2$ is a divalent group that serves to connect two ligands to each other and selected from hydrocarbon groups having 1 to 20 carbon atoms such as alkylene groups, substituted alkylene groups, and alkylidene groups; halogen-containing groups; silicon-containing groups; germanium-containing groups; and tin-containing groups; in particular, hydrocarbon groups having 1 to 20 carbon atoms, such as alkylene groups, substituted alkylene groups, and alkylidene groups, and silicon-containing groups are preferred, and hydrocarbon groups having 1 to 10 carbon atoms, such as alkylene groups, substituted alkylene groups, and alkylidene groups are especially preferred.

Examples of Xs include the same ones as specified for Xs in Formula (I).

Specific examples of a preferred compound used as the component (CB) represented by Formula (II) include isopropylidene(cyclopentadienyl)(fluorenyl)zirconium dichloride, isopropylidene(cyclopentadienyl)(2,7-di-t-butyl-9-fluorenyl)zirconium dichloride, isopropylidene (cyclopentadienyl)(3,6-di-t-butylfluorenyl)zirconium dichloride, isopropylidene(cyclopentadienyl)(octamethyloctahydridodibenzofluorenyl)zirconium dichloride, dibutylmethylene(cyclopentadienyl) (fluorenyl)zirconium dichloride, dibutylmethylene(cyclopentadienyl) (2,7-di-t-butylfluorenyl)zirconium dichloride, dibutylmethylene(cyclopentadienyl) (3,6-di-t-butylfluorenyl)zirconium dichloride, dibutylmethylene(cyclopentadienyl) (octamethyloctahydridodibenzofluorenyl)zirconium dichloride, cyclohexylidene(cyclopentadienyl)(fluorenyl)zirconium dichloride, cyclohexylidene(cyclopentadienyl)(2,7-di-t-butylfluorenyl)zirconium dichloride, cyclohexylidene(cyclopentadienyl)(3,6-di-t-butylfluorenyl)zirconium dichloride, cyclohexylidene (cyclopentadienyl) (octamethyloctahydridodibenzofluorenyl)zirconium dichloride, dimethylsilyl(cyclopentadienyl)(fluorenyl)zirconium dichloride, dimethylsilyl(cyclopentadienyl)(2,7-di-t-butylfluorenyl)zirconium dichloride, dimethylsilyl(cyclopentadienyl)(3,6-di-t-butylfluorenyl)zirconium dichloride, and dimethylsilyl(cyclopentadienyl) (octamethyloctahydridodibenzofluorenyl)zirconium dichloride; a specific example of a more preferred compound is isopropylidene(cyclopentadienyl)(2,7-di-t-butyl-9-fluorenyl)zirconium dichloride.

Component (CC) The component (CC) that can be used in the present invention is at least one compound selected from the group consisting of the following compounds (cc-1) to (cc-3).

(cc-1) an organometallic compound represented by Formula (III), (IV), or (V)

$$R^a_m Al(OR^b)_n H_p X_q \quad (III)$$

[in Formula (III), $R^a$ and $R^b$ each represent a hydrocarbon group having 1 to 15 carbon atoms and may be the same as or different from each other, X represents a halogen atom, and m, n, p, and q are values that fulfill the relationship of m+n+p+q=3 and that fulfill the following relationships, respectively: 0<m≤3, 0≤n<3, 0≤p<3, and 0≤q<3.]

$$M^a AlR^a_4 \quad (IV)$$

[In Formula (IV), $M^a$ represents Li, Na, or K, and $R^a$ represents a hydrocarbon group having 1 to 15 carbon atoms.]

$$R^a_r M^b R^b_s X_t \quad (V)$$

[In Formula (V), $R^a$ and $R^b$ each represent a hydrocarbon group having 1 to 15 carbon atoms and may be the same as or different from each other, $M^b$ represents Mg, Zn, or Cd, X represents a halogen atom, and r, s, t fulfill the relationship of r+s+t=2 and the following relationships, respectively: 0<r≤2, 0≤s≤1, and 0≤t≤1.]

(cc-2) an organoaluminum oxy-compound, and (cc-3) a compound which reacts with the components (CA) and (CB) to form an ion pair Among organometallic compounds (cc-1) represented by Formulae (III), (IV), and (V), an organometallic compound represented by Formula (III) is preferred, and specific examples thereof include trialkylaluminums such as trimethylaluminum, triethylaluminum, triisopropylaluminum, triisobutylaluminum, trihexylaluminum, and trisoctylaluminum; and alkylaluminum hydrides such as dimethylaluminum hydride, diethylaluminum hydride, diisopropylaluminum hydride, di-n-butylaluminum hydride, diisobutylaluminium hydride, and diisohexylaluminum hydride. These compounds may be used solely or in combination.

The organoaluminum oxy-compound (cc-2) is preferably organoaluminum oxy-compounds synthesized from trialkylaluminum or tricycloalkylaluminum, and especially preferably aluminoxanes synthesized from trimethylaluminum or triisobutylaluminum. Such organoaluminum oxy-compounds may be used solely or in combination.

Non-limiting examples of the compound which reacts with the components (CA) and (CB) to form an ion pair (cc-3) include Lewis acids, ionic compounds, borane compounds, and carborane compounds disclosed in JP-A-H1-501950, JP-A-H1-502036, JP-A-H3-179005, JP-A-H3-179006, JP-A-H3-207703, and JP-A-H3-207704 and U.S. Pat. No. 5,321,106; heteropoly compounds; and isopoly compounds.

Solid Support (S)

The solid support (S) which can be optionally used in the present invention is an inorganic or organic compound and is a granular or particulate solid.

Examples of the inorganic compound include porous oxides, inorganic chlorides, clay, clay minerals, and ion-exchange layered compounds, and porous oxides are preferred.

Examples of usable porous oxides include $SiO_2$, $Al_2O_3$, MgO, ZrO, $TiO_2$, $B_2O_3$, CaO, ZnO, BaO, and $ThO_2$ and composites and mixtures containing such oxides, in particular, natural or synthetic zeolites, $SiO_2$—MgO, $SiO_2$—$Al_2O_3$, $SiO_2$—$TiO_2$, $SiO_2$—$V_2O_5$, $SiO_2$—$Cr_2O_3$, and $SiO_2$—$TiO_2$—MgO. Among these, materials primarily containing $SiO_2$ are preferred.

Although such porous oxides have different characteristics depending on the types and production process thereof, a preferred solid support used in the present invention has the following characteristics: a particle size that is typically in the range of 0.2 to 300 μm, and preferably 1 to 200 μm, a specific surface area that is typically in the range of 50 to 1200 m²/g, and preferably 100 to 1000 m²/g, and a pore volume that is typically in the range of 0.3 to 30 cm³/g. Such a support is optionally calcined at, for example, 100 to 1000° C., and preferably 150 to 700° C.

Component (G)

The component (G) which can be optionally used in the present invention is at least one compound selected from the group consisting of the following compounds (g-1) to (g-6).

(g-1) Polyalkylene oxide block polymer,
(g-2) Higher aliphatic amide,
(g-3) Polyalkylene oxide,
(g-4) Polyalkylene oxide alkylether,
(g-5) Alkyldiethanolamine, and
(g-6) Polyoxyalkylene alkylamine In the present invention, in order to reduce fouling in a reactor or to improve the characteristics of produced polymer particles, such a component (G) can be present in the catalyst for producing the ethylene polymer component (B). Among the components (G), the components (g-1), (g-2), (g-3), and (g-4) are preferred, and the components (g-1) and (g-2) are especially preferred. An example of the component (g-2) is higher aliphatic diethanolamide.

Preparation Process of Catalyst for Producing Ethylene Polymer Component (B)

A preparation process of the catalyst for producing the ethylene polymer component (B) used in the present invention will now be described.

The catalyst for producing the ethylene polymer component (B) can be prepared by adding the components (CA), (CB), and (CC) to an inert hydrocarbon or to a polymerization system in which an inert hydrocarbon is used.

The components can be added in any order; however, preferred orders are, for example, as follows:

i) the components (CA) and (CB) are mixed and brought into contact with each other, the component (CC) is subsequently brought into contact therewith, and then the resultant product is added to a polymerization system;

ii) the components (CA) and (CC) are mixed and brought into contact with each other, the components (CB) and (CC) are mixed and brought into contact with each other, and these contact products are added to a polymerization system; and iii) the components (CA), (CB), and (CC) are successively added to a polymerization system.

When the solid support (S) is used, at least one of the components (CA), (CB), and (CC) can be brought into contact with the solid support (S) in an inert hydrocarbon to give a solid catalyst component (X). The components can be brought into contact with each other in any order; however, preferred orders are, for example, as follows:

iv) the component (CC) is brought into contact with the solid support (S), and then the components (CA) and (CB) are brought into contact therewith, thereby giving the solid catalyst component (X);

v) the components (CA), (CB), and (CC) are mixed and brought into contact with each other and then brought into contact with the solid support (S), thereby giving the solid catalyst component (X); and vi) the component (CC) is brought into contact with the solid support (S), the component (CA) is subsequently brought into contact therewith to give a solid catalyst component (X1), the component (CC) is brought into contact with the solid support (S), the component (CB) is subsequently brought into contact therewith to give a solid catalyst component (X2), and these solid catalyst components (X1) and (X2) are used.

The order iv) is more preferred.

Specific examples of the inert hydrocarbon include aliphatic hydrocarbons such as propane, butane, pentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; halogenated hydrocarbons such as ethylene chloride, chlorobenzene, and dichloromethane; and mixtures thereof.

The contact time of the component (CC) with the solid support (S) is typically in the range of 0 to 20 hours, and preferably 0 to 10 hours; and the contact temperature thereof is typically in the range of −50 to 200° C., and preferably −20 to 120° C. The molar ratio of the component (CC) to the solid support (S) in the contact (component (CC)/solid support (S)) is typically in the range of 0.2 to 2.0, and particularly preferably 0.4 to 2.0.

The contact time of the product, which has been formed by the contact of the component (CC) with the solid support (S), with the components (CA) and (CB) are typically in the range of 0 to 5 hours, and preferably 0 to 2 hours; the contact temperature thereof is typically in the range of −50 to 200° C., and preferably −50 to 100° C. The amounts of the components (CA) and (CB) to be brought into contact with each other largely depend on the type and amount of the component (CC). When the component (cc-1) is used, the amounts of the components (CA) and (CB) are adjusted such that the molar ratio [(cc-1)/M] of the component (cc-1) to all of the transition metal atoms (M) contained in the components (CA) and (CB) is typically in the range of 0.01 to 100000, and preferably 0.05 to 50000; when the component (cc-2) is used, the amounts of the components (CA) and (CB) are adjusted such that the molar ratio [(cc-2)/M] of the aluminum atoms contained in the component (cc-2) to all of the transition metal atoms (M) contained in the components (CA) and (CB) is typically in the range of 10 to 500000, and preferably 20 to 100000; and when the component (cc-3) is used, the amounts of the components (CA) and (CB) are adjusted such that the molar ratio [(cc-3)/M] of the component (cc-3) to all of the transition metal atoms (M) contained in the components (CA) and (CB) is typically in the range of 1 to 10, and preferably 1 to 5. The ratio of the component (CC) to all of the transition metal atoms (M) contained in the components (CA) and (CB) can be obtained by inductively coupled plasma (ICP) atomic emission spectroscopy.

The ratio of the amount of the component (CA) to the amount of the component (CB) can be appropriately determined on the basis of the molecular weight and molecular weight distribution of the ethylene polymer; in a preferred range thereof, a ratio of a polymer derived from the component (CA) to a polymer derived from the component (CB) (hereinafter also referred to as "product ratio of polymers derived from the components (CA) and (CB)") [=the amount of a polymer derived from the component (CA)/the amount of a polymer derived from the component (CB)] is typically in the range of 40/60 to 95/5, preferably 50/50 to 95/5, and more preferably 60/40 to 95/5.

Calculation of the product ratio of polymers derived from the components (CA) and (CB) will now be described.

The molecular weight distribution curve of the ethylene polymer component (B), which can be obtained by GPC analysis, substantially has three peaks. Among these three peaks, the peak positioned on the lowest-molecular-weight side is the peak attributed to a polymer derived from the component (CA), the second peak is the peak attributed to a polymer derived from the component (CB), and the third peak, which is positioned on the highest-molecular-weight side, is the peak which appears only when both the components (CA) and (CB) are used. The ratio of the peak attributed to a polymer derived from the component (CA) (namely, the above-mentioned peak on the lowest-molecular-weight side) to the peak attributed to a polymer derived from the component (CB) (namely, the above-mentioned second peak) [=the peak attributed to a polymer derived from the component (CA)/the peak attributed to a polymer derived from the component (CB)] is defined as the product ratio of polymers derived from the components (CA) and (CB) [=the amount of a polymer derived from the component (CA)/the amount of a polymer derived from the component (CB)].

The ratio between the peaks is determined by the method which will be described below and in which the following molecular weight distribution curves are used:

a molecular weight distribution curve (G1) of the ethylene polymer component (B);

a molecular weight distribution curve (G2) of an ethylene polymer produced through polymerization under the same conditions as in production of the ethylene polymer component (B) except that a catalyst containing the components (CA) and (CC) and the solid support (S) (namely, a catalyst not containing the component (CB)) is used; and a molecular weight distribution curve (G3) of an ethylene polymer produced through polymerization under the same conditions as in production of the ethylene polymer component (B) except that a catalyst containing the components (CB) and (CC) and the solid support (S) (namely, a catalyst not containing the component (CA)) is used.

The term "molecular weight distribution curve" herein refers to a differential molecular weight distribution curve unless otherwise specified, and the term "area" mentioned with respect to a molecular weight distribution curve herein refers to the area of a region formed between the molecular weight distribution curve and the base line.

[1] In numerical data of each of the molecular weight distribution curves (G1), (G2), and (G3), Log (molecular weight) is divided into 0.02 units, and the intensity [dwt/d (log molecular weight)] in each of the molecular weight distribution curves (G1), (G2), and (G3) is normalized such that the area would be 1.

[2] A composite curve (G4) is formed from the molecular weight distribution curves (G2) and (G3). In this case, the intensity in each molecular weight unit in the molecular weight distribution curves (G2) and (G3) is properly changed in a certain proportion such that the absolute value of the difference in the intensity in each molecular weight unit between the molecular weight distribution curve (G1) and the composite curve (G4) is approximately not more than 0.0005. Since the absolute value of the difference in the intensity between the molecular weight distribution curve (G1) and the composite curve (G4) is greater than 0.0005 on the high-molecular-weight side owing to an effect of the generated third peak, the intensity in the molecular weight distribution curves (G2) and (G3) is changed such that the absolute value of the difference in the intensity between the molecular weight distribution curve (G1) and the composite curve (G4) is not more than 0.0005 on the lower-molecular-weight side.

[3] Assuming that the molecular weight at the largest weight fraction in the molecular weight distribution curve (G1) is determined as the peak top; part of the molecular weight distribution curve (G1) which does not overlap the composite curve (G4) on the higher-molecular-weight side relative to the peak top, namely, a peak (P5) [(G1)-(G4)] which appears on the higher-molecular-weight side from the molecular weight at the largest weight fraction in the molecular weight distribution curve (G1) in a difference curve (G5), which is generated as a difference curve between the molecular weight distribution curve (G1) and the composite curve (G4), is defined as a third peak (namely, the above-mentioned "third peak").

[4] Percentage Wa of the peak attributed to a polymer derived from the component (CA) and a percentage Wb of the peak attributed to a polymer derived from the component (CB) are calculated as follows.

$$Wa=S(G2)/S(G4)$$

$$Wb=S(G3)/S(G4)$$

S(G2) and S(G3) are the areas of the molecular weight distribution curves (G2) and (G3) after the changes in intensity, respectively, and S(G4) is the area of the composite curve (G4).

If the composite curve (G4) is obtained by multiplying the intensity of the molecular weight distribution curve (G2) by x, multiplying the intensity of the molecular weight distribution curve (G3) by y, and adding the products to each other, for example, since the initial area of each of the molecular weight distribution curves (G2) and (G3) has been normalized to 1 as described in [1], S(G2), S(G3), and S(G4) are x, y, (x+y), respectively. Hence, the Wa and Wb can be represented as follows with use of x and y.

$$Wa=x/(x+y)$$

$$Wb=y/(x+y)$$

Long-chain branching is effectively generated when the amount of a polymer derived from the component (CA) is large, and the molar ratio of the component (CA) to the component (CB) on a transition metal compound basis can be appropriately determined provided that polymers derived therefrom fulfill the above-mentioned range.

In the production of the ethylene polymer component (B), although the above-mentioned solid catalyst component (X) can be directly used, the solid catalyst component (X) can be preliminarily polymerized with olefin into a prepolymerized catalyst component (XP) and then used.

The prepolymerized catalyst component (XP) can be prepared by introducing olefin in the presence of the solid catalyst component (X) typically in an inert hydrocarbon solvent, and the preparation can be carried out through batch, semi-continuous, or continuous polymerization under reduced or normal pressure or application of pressure. Through this preliminary polymerization, a polymer is produced in an amount that is typically in the range of 0.01 to 1000 g, preferably 0.1 to 800 g, and more preferably 0.2 to 500 g per gram of the solid catalyst component (X).

After the prepolymerized catalyst component prepared in the inert hydrocarbon solvent is separated from a suspension, the prepolymerized catalyst component may be then re-suspended in an inert hydrocarbon and olefin may be introduced into the resulting suspension. Alternatively, the prepolymerized catalyst component may be dried, and then olefin may be introduced.

In the preliminary polymerization, the preliminary polymerization temperature is typically in the range of −20 to 80° C., and preferably 0 to 60° C., and the preliminary polymerization time is typically in the range of 0.5 to 100 hours, and preferably 1 to 50 hours.

The solid catalyst component (X) prepared in any of the above-mentioned manners can be used in the preliminary polymerization without limitation. The component (CC) can be optionally used; in particular, an organoaluminum compound represented by Formula (III) of the component (cc-1) is preferably used. In the use of the component (CC), the component (CC) is used such that a molar ratio of the aluminum atom (Al—C) contained in the component (CC) to the transition metal compound (component (CC)/transition metal compound) is typically in the range of 0.1 to 10000, and preferably 0.5 to 5000.

The concentration of the solid catalyst component (X) in a preliminary polymerization system is normally in the range of 1 to 1000 g/L, and preferably 10 to 500 g/L in terms of a ratio of the solid catalyst component (X)/polymerization volume of a liter.

The component (G) may be used in any step in the preparation of the catalyst for producing the ethylene polymer component (B) and may be brought into contact in any order. The component (G) may be brought into contact with the prepolymerized catalyst component (XP) produced through the preliminary polymerization.

In use of the catalyst for producing the ethylene polymer component (B) for polymerization of ethylene or polymerization of ethylene with an α-olefin having 4 to 20 carbon atoms, each of the components (CA) and (CB) is used in an amount of typically $10^{-12}$ to $10^{-1}$ moles, and preferably $10^{-8}$ to $10^{-2}$ moles per liter of a reaction volume.

The polymerization temperature is typically in the range of −50 to 200° C., preferably 0 to 170° C., and especially preferably 60 to 170° C. The polymerization pressure is typically in the range of normal pressure to 100 kgf/cm², and preferably normal pressure to 50 kgf/cm². The polymerization reaction may be batch, semi-continuous, or continuous polymerization. The polymerization may be carried out in two or more stages in which the reaction conditions are different from each other.

The molecular weight of the ethylene polymer component (B) to be produced can be adjusted by allowing hydrogen to be present in a polymerization system or changing the polymerization temperature. Furthermore, the component (G) can be present in a polymerization system to reduce fouling or improve particle characteristics.

In the present invention, the ethylene polymer component (B) obtained through polymerization reaction as it is may be used in the production of the ethylene polymer composition (E). In order to inhibit variation in properties, the ethylene polymer component (B) may be blended with "other component" which will be described later to provide an ethylene polymer composition (B') composed of the ethylene polymer component (B) and "other component" and thereby may be used in the production of the ethylene polymer composition (E). The ethylene polymer component (B) particles obtained through polymerization reaction can be blended with "other component" optionally added by any of methods including appropriate methods conventionally known. Blending operations described above may be, for example, dry blending, or dry blending followed by melting, kneading and further an optional operation such as granulating operation. The operations such as melting, kneading and granulating may be carried out by any method.

<Ethylene Polymer Component (A)>

The ethylene polymer composition (E) according to the present invention comprises the ethylene polymer component (A). In the present invention, the ethylene polymer component (A) is used, as will be described later, as a linear ethylene polymer component having substantially no long-chain branching.

The ethylene polymer component (A) contains the ethylene polymer (a) described later as an indispensable component, at 20% by weight or more and 100% by weight or less, and has properties shown by the following requirements (A-1) to (A-3).

(A-1) Melt flow rate (MFR$_A$) at 190° C. under a load of 2.16 kg is not less than 0.01 g/10 min and not more than 10 g/10 min. The lower limit of the range is preferably 0.05 g/10 min, and more preferably 0.1 g/10 min; and the upper limit thereof is preferably 6.0 g/10 min, and more preferably 4.0 g/10 min.

When the melt flow rate (MFR$_A$) is not less than the above-mentioned lower limit, the ethylene polymer composition (E) is prevented from having unnecessarily high shear viscosity and elongational viscosity and has a good formability. When the melt flow rate (MFR$_A$) is not more than the above-mentioned upper limit, the ethylene polymer composition (E) has high melt tension and stretching is possible in a broader temperature range without causing film hanging or breakage.

The melt flow rate (MFR$_A$) of the ethylene polymer component (A) can be changed by changing a hydrogen/ethylene ratio in copolymerization reaction, in the same manner as in the melt flow rate (MFR$_B$) of the ethylene polymer component (B).

(A-2) Density (D$_A$) is 890 kg/m³ or more and 940 kg/m³ or less. A lower limit thereof is preferably 900 kg/m³, and more preferably 905 kg/m³; and an upper limit thereof is preferably 930 kg/m³, and more preferably 925 kg/m³.

When the density (D$_A$) is not less than the above-mentioned lower limit, the surface of a film formed of the ethylene polymer composition (E) is less sticky, and the film has an excellent blocking resistance. When the density (D$_A$) is not more than the upper limit, the ethylene polymer composition (E) enables stretching in a broader temperature range, and a film formed therefrom has further improved impact resistance and improved mechanical strength such as heat seal strength and resistance to breakage.

The density (D$_A$) of the ethylene polymer component (A) can be adjusted by changing an α-olefin/ethylene ratio in copolymerization reaction, in the same manner as in the density (D$_B$) of the ethylene polymer component (B), and thereby the ethylene polymer having a density in the above-mentioned range can be produced.

(A-3) Ratio [η]/Mw$^{0.776}$ of intrinsic viscosity measured in decalin at 135° C. [[η] (dl/g)] to weight average molecular weight measured by GPC-viscometry (GPC-VISCO) to the power 0.776 (Mw$^{0.776}$) is not less than 1.90×10$^{-4}$ and not more than 2.80×10$^{-4}$. Specifically, in the ethylene polymer component (A) used in the present invention, [η] and Mw fulfill Equation (Eq-6).

$$1.90\times10^{-4} \leq [\eta]/Mw^{0.776} \leq 2.80\times10^{-4} \quad \text{(Eq-6)}$$

Allowing [η]/Mw$^{0.776}$ to be not less than 1.90×10$^{-4}$ and not more than 2.80×10$^{-4}$ is equivalent to that, in double logarithmic plot of [η] and Mw, log ([η]) and log (Mw) are in a region defined by Equation (Eq-6').

$$0.776\,\text{Log(Mw)}-3.721 \leq \text{Log}([\eta]) \leq 0.776\,\text{Log(Mw)}-3.553 \quad \text{(Eq-6')}$$

As described above, it is known that ethylene polymers having no long-chain branching have a large intrinsic viscosity [η](dl/g) relative to their molecular weight, as compared with ethylene polymers having long-chain branching. Thus, ethylene polymers having [η]/Mw$^{0.776}$ of not less than 1.90×10$^{-4}$ are linear ethylene polymers having substantially no long-chain branching. In the present invention including such ethylene polymers, the ethylene polymer composition (E) has improved melt tension, and stretching is possible in a broader temperature range.

It is preferred that the ethylene polymer component (A) used in the present invention fulfill the following requirement (A-4) in addition to the above requirements.

(A-4) Sum of the number of methyl branches [Me(/1000C)] and the number of ethyl branches [Et(/1000C)] per 1000 carbon atoms in $^{13}$C-NMR analysis [(Me+Et)(/1000C)] is not more than 1.80, preferably not more than 1.30, more preferably not more than 0.80, and further preferably not more than 0.50.

When the sum of the number of methyl branches and the number of ethyl branches [(Me+Et)(/1000C)] is not more than the above-mentioned value, the ethylene polymerization composition (E) has improved mechanical strength.

Ethylene Polymer (a)

In the present invention, the ethylene polymer component (A) contains the ethylene polymer (a).

The ethylene polymer (a) used in the present invention is a copolymer of ethylene and an α-olefin having 4 to 10 carbon atoms, and fulfills the following requirements (a-1) to (a-3). The "copolymer of ethylene and an α-olefin having 4 to 10 carbon atoms" used as the ethylene polymer (a) is preferably a copolymer of ethylene and an α-olefin having 6 to 10 carbon atoms. If α-olefin having 4 carbon atoms is used as the "α-olefin having 4 to 10 carbon atoms", it is preferably used together with an α-olefin having 6 to 10 carbon atoms.

Examples of the α-olefin having 4 to 10 carbon atoms constituting the ethylene polymer (a) include 1-butene, 1-hexene, 4-methyl-1-pentene, 1-octene and 1-decene.

In the ethylene polymer component (A), the ethylene polymer (a) accounts for 20% by weight or more and not more than 100% by weight, its lower limit being preferably 40% by weight and more preferably 60% by weight.

By the ethylene polymer component (A) containing the ethylene polymer (a) at the above-mentioned range, the ethylene polymer composition (E) can be stretched in a broader temperature range, and a biaxially-stretched film resulting therefrom achieves improved thickness accuracy.

The requirements (a-1) to (a-3) to be fulfilled by the ethylene polymer (a) are as follows.

(a-1) Melt flow rate ($MFR_a$) at 190° C. under a load of 2.16 kg is not less than 0.01 g/10 min and not more than 5.0 g/10 min.

A lower limit of the melt flow rate ($MFR_a$) is preferably 0.05 g/10 min, and more preferably 0.1 g/10 min; and an upper limit thereof is preferably 3.0 g/10 min, more preferably 1.0 g/10 min, and further preferably 0.5 g/10 min.

The melt flow rate ($MFR_a$) being in the above-mentioned range allows the ethylene polymer composition (E) to provide a raw fabric with increased melt viscosity, enabling stretching in a broader temperature range; allows solid entanglements of molecular chains with the ethylene polymer component (B) to be formed in the composition, leading to improved thickness accuracy; and prevents the composition from having unnecessarily high shear viscosity and elongational viscosity thereby providing improved extrusion•sheet formability.

The melt flow rate ($MFR_a$) can be adjusted to fall in the above-mentioned range by changing a hydrogen/ethylene ratio in copolymerization reaction, as is described for the above (A-1).

(a-2) Density ($D_a$) is 890 kg/m$^3$ or more and 928 kg/m$^3$ or less, its lower limit being preferably 895 kg/m$^3$ and more preferably 900 kg/m$^3$.

An upper limit of the density ($D_a$) is preferably 920 kg/m$^3$, and more preferably 915 kg/m$^3$.

When the density ($D_a$) is in the above-mentioned range, in which case the ethylene polymer (a) is at a molten state at the time of stretching, the ethylene polymer composition (E) provides a raw fabric which has increased melt viscosity and the raw fabric can be stretched in a broader temperature range, and thickness accuracy is improved.

The density ($D_a$) can be adjusted to fall in the above-mentioned range by changing an α-olefin/ethylene ratio in copolymerization reaction, as described for the above (A-2).

(a-3) $(D_B - D_a) \geq 1$ kg/m$^3$, preferably $(D_B - D_a) \geq 3$ kg/m$^3$, and more preferably $(D_B - D_a) \geq 5$ kg/m$^3$.

That is, the ethylene polymer (a) used in the present invention has lower density than that of the ethylene polymer component (B). When the density ($D_a$) of the ethylene polymer (a) is lower than the density ($D_B$) of the ethylene polymer component (B) as described above, in which case the ethylene polymer (a) is at a molten state at the time of stretching, the ethylene polymer composition (E) provides a raw fabric with increased melt viscosity, and the raw fabric can be stretched in a broader temperature range, and thickness accuracy is improved.

The ethylene polymer (a) can be obtained by copolymerizing ethylene with an α-olefin having 4 to 10 carbon atoms, and polymerization catalysts and polymerization conditions adopted at this time are not particularly limited as long as the above requirements are fulfilled. The ethylene polymer (a) can be prepared by conventionally known production methods using, for example, Ziegler catalysts, single-site catalysts or the like. The ethylene polymer (a) is particularly preferably a copolymer obtained by using a catalyst containing a metallocene compound.

It is preferable that the catalyst containing a metallocene compound be composed of (a) a metallocene compound of a transition metal, (b) an organoaluminum-oxy compound and (c) a support. The catalyst, composed of the components described above, may further contain, as needed, (d) an organoaluminum compound and/or an organoboron compound.

Olefin polymerization catalysts containing such a metallocene compound and methods for preparing the ethylene polymers by using catalysts are described, for example, in JP-A-H8-269270.

Ethylene Polymer (c)

In the present invention, the ethylene polymer component (A) may further contain an ethylene polymer (c) in addition to the above ethylene polymer (a).

The ethylene polymer (c) that can be optionally used in the present invention is a copolymer of ethylene and an α-olefin having 4 to 10 carbon atoms, and fulfills the following requirements (c-1) to (c-4).

The "copolymer of ethylene and an α-olefin having 4 to 10 carbon atoms" used as the ethylene polymer (c) is preferably a copolymer of ethylene and an α-olefin having 6 to 10 carbon atoms. If α-olefin having 4 carbon atoms is used as the "α-olefin having 4 to 10 carbon atoms", it is preferred that α-olefin having 4 carbon atoms be used together with an α-olefin having 6 to 10 carbon atoms.

For the α-olefin having 4 to 10 carbon atoms constituting the ethylene polymer (c), examples raised as constituting the ethylene polymer (a) can be mentioned.

In the ethylene polymer component (A), the ethylene polymer (c) accounts for preferably 20% by weight or more and 50% by weight or less. A lower limit thereof is more preferably 25% by weight, and still more preferably 30% by weight; and an upper limit thereof is more preferably 45% by weight, and still more preferably 40% by weight.

The inclusion of the ethylene polymer (c) in the above-mentioned range allows the ethylene polymer composition (E) to attain shear viscosity and elongational viscosity low enough to provide good formability, and prevents its raw fabric from having unnecessarily low melt viscosity, enabling stretching in a broader temperature range.

Requirements (c-1) to (c-4) to be fulfilled by the ethylene polymer (c) are as follows.

(c-1) Melt flow rate ($MFR_c$) at 190° C. under a load of 2.16 kg is not less than 0.01 g/10 min and not more than 3000 g/10 min.

A lower limit thereof is preferably 1.0 g/10 min, more preferably 10 g/10 min, and further preferably 30 g/10 min;

and an upper limit thereof is preferably 1000 g/10 min, more preferably 500 g/10 min, and further preferably 100 g/10 min.

The inclusion of the ethylene polymer (c) with its melt flow rate ($MFR_c$) in the above-mentioned range in the ethylene polymer composition (E) allows the composition to attain shear viscosity and elongational viscosity low enough to give good extrusion•sheet formability, and prevents its raw fabric from having unnecessarily low melt viscosity, allowing the temperature range in which stretching is possible to be maintained.

The melt flow rate ($MFR_c$) can be adjusted to fall in the above-mentioned range by changing a hydrogen/ethylene ratio in copolymerization reaction, as is described for the above (A-1).

(c-2) $(MFR_c-MFR_a) \geq 1$ g/min, preferably $(MFR_c-MFR_a) \geq 3$ g/m³, and more preferably $(MFR_c-MFR_a) \geq 5$ g/min.

(c-3) Density ($D_c$) is 900 kg/m³ or more and 940 kg/m³ or less. A lower limit thereof is preferably 910 kg/m³, and more preferably 915 kg/m³; and an upper limit thereof is preferably 935 kg/m³, and more preferably 930 kg/m³.

The density ($D_c$) being in the above-mentioned range allows the ethylene polymer composition (E) to provide a broad temperature range in which stretching is possible.

The density ($D_c$) can be adjusted to fall in the above-mentioned range by changing an α-olefin/ethylene ratio in copolymerization reaction, as is described for the above (A-2).

(c-4) $(D_c-D_a) \geq 1$ kg/m³, preferably $(D_c-D_a) \geq 5$ kg/m³, more preferably $(D_c-D_a) \geq 10$ kg/m³.

By the ethylene polymer (c) having a larger density than the density of the ethylene polymer (a), the ethylene polymer composition (E) is allowed to provide a broad temperature range in which stretching is possible. The broadened temperature range in which stretching is possible is presumably because of the broadness of the density distribution of the ethylene polymer composition (E) leading to the broadness of lamella thickness distribution of its raw fabric film, as will be described later.

At the time of stretching, most of the molten parts come to be the ethylene polymer (a), which greatly contributes to entangling of molecular chains. As a result thereof, improved thickness accuracy is achieved.

If an ethylene polymer fulfilling the requirements for the ethylene polymer (c) also fulfills the requirements for the ethylene polymer (a), the present invention regards such an ethylene polymer as the ethylene polymer (a).

The ethylene polymer (c) can be obtained by copolymerizing ethylene with an α-olefin having 4 to 10 carbon atoms. Polymerization catalysts and polymerization conditions adopted at that time are not particularly limited as long as the above requirements are fulfilled. The ethylene polymer (c) can be obtained in the same manner as in the ethylene polymer (a). Polymerization conditions and the like at that time can be appropriately determined based on the descriptions provided for e.g., the requirements (c-1) to (c-4), for example by changing a hydrogen/ethylene ratio and/or an α-olefin/ethylene ratio.

Ethylene Polymer (d)

In the present invention, the ethylene polymer component (A), containing not just the ethylene polymer (a), may contain an ethylene polymer (d) instead of the ethylene polymer (c) or together with the ethylene polymer (c).

The ethylene polymer (d) that can be optionally used in the present invention is an ethylene homopolymer or a copolymer of ethylene and an α-olefin having 3 to 10 carbon atoms, and fulfills the following requirements (d-1) and (d-2).

The "copolymer of ethylene and an α-olefin having 3 to 10 carbon atoms" which can be used as the ethylene polymer (d) is preferably a copolymer of ethylene and an α-olefin having 6 to 10 carbon atoms. If α-olefin having 3 or 4 carbon atoms is used as the "α-olefin having 3 to 10 carbon atoms", it is preferred that α-olefin having 3 or 4 carbon atoms be used together with an α-olefin having 6 to 10 carbon atoms.

The α-olefins having 3 to 10 carbon atoms constituting the ethylene polymer (d) include propylene, and α-olefins given as the α-olefin having 4 to 10 carbon atoms constituting the ethylene polymer (a).

In the ethylene polymer component (A), the ethylene polymer (d) accounts for preferably 10% by weight or more and 50% by weight or less. A lower limit thereof is more preferably 15% by weight, and further preferably 20% by weight; and an upper limit thereof is more preferably 45% by weight, and further preferably 40% by weight.

The inclusion of the ethylene polymer (d) in the above-mentioned range allows the biaxially-stretched film to have improved thickness accuracy and to exhibit rigidity and strength. This is believed to be because the ethylene polymer (d), which has high crystallinity, functions as a crystal nucleating agent, which reduces spherulites in the ethylene polymer composition (E).

Requirements (d-1) and (d-2) to be fulfilled by the ethylene polymer (d) are as follows.

(d-1) Melt flow rate ($MFR_d$) at 190° C. under a load of 2.16 kg is not less than 0.01 g/10 min and not more than 2 g/10 min. A lower limit thereof is preferably 0.1 g/10 min, and more preferably 0.5 g/10 min, and an upper limit thereof is preferably 1.5 g/10 min, and more preferably 1 g/10 min.

When the melt flow rate ($MFR_d$) falls in the above-mentioned range, the biaxially-stretched film has improved thickness accuracy and exhibits rigidity and strength.

The melt flow rate ($MFR_d$) can be adjusted by changing a hydrogen/ethylene ratio in copolymerization reaction, as described for the above (A-1).

(d-2) Density ($D_d$) is more than 940 kg/m³ and 980 kg/m³ or less. A lower limit thereof is preferably 945 kg/m³, and more preferably 950 kg/m³; and an upper limit thereof is preferably 970 kg/m³, and more preferably 960 kg/m³.

When the density ($D_d$) is in the above-mentioned range, the biaxially-stretched film has improved thickness accuracy and exhibits rigidity and strength.

The density ($D_d$) can be adjusted to fall in the above-mentioned range by changing an α-olefin/ethylene ratio in copolymerization reaction, as described for the above (A-2).

Polymerization catalysts and polymerization conditions adopted for the ethylene polymer (d) are not particularly limited as long as polymers fulfilling the above requirement are obtained. The ethylene polymer (d) can be produced, for example, by conventionally known methods using Ziegler catalysts, single-site catalysts and the like.

When the ethylene polymer component (A) contains both the ethylene polymer (c) and the ethylene polymer (d), it is preferred that the ethylene polymer (a) account for 20% by weight or more and 70% by weight or less, the ethylene polymer (c) account for 20% by weight or more and 50% by weight or less, and the ethylene polymer (d) account for 10% by weight or more and 50% by weight or less.

It is more preferred in the ethylene polymer component (A) that the ethylene polymer (a) account for 40% by weight or more and 70% by weight or less, the ethylene polymer (c) account for 20% by weight or more and 45% by weight or less, and the ethylene polymer (d) account for 10% by weight or more and 40% by weight or less.

As described above, the ethylene polymer component (A) contains at least the ethylene polymer (a), and typical embodiments of its constituents are for examples as follows:

an ethylene polymer component (A1) consisting only of the ethylene polymer (a);

an ethylene polymer component (A2) composed of the ethylene polymer (a) and the ethylene polymer (c);

an ethylene polymer component (A3) composed of the ethylene polymer (a) and the ethylene polymer (d); and an ethylene polymer component (A4) composed of the ethylene polymer (a), the ethylene polymer (c) and the ethylene polymer (d).

In providing the ethylene polymer component (A) used in the present invention, the ethylene polymer (a) as it is may be used, or the ethylene polymer (a) may be blended with the ethylene polymer (c) and/or the ethylene polymer (d) by any method including appropriate known method.

In the present invention, the ethylene polymer component (A) as it is may used in the production of the ethylene polymer composition (E). On the other hand, in order to inhibit variation in properties, "other component" which will be described later may be incorporated to form a blend of the ethylene polymer component (A) and "other component" which will be described later, labeled as an ethylene polymer composition (A'), which may be used in the production of the ethylene polymer composition (E). The ethylene polymer composition (A') contains neither the ethylene polymer component (B) nor "other thermoplastic resin", which is optionally present in the ethylene polymer composition (E), and in this respect is distinguished from the ethylene polymer composition (E).

In order to obtain the ethylene polymer composition (A'), "other component" may be blended into the ethylene polymer component (A); alternatively, "other component" as well as the ethylene polymer (c) and/or the ethylene polymer (d) to be optionally used may be blended into the ethylene polymer (a).

In order to obtain the ethylene polymer composition (A'), it is possible that "other component" is blended into the ethylene polymer (a) to give an ethylene polymer composition (a') composed of the ethylene polymer (a) and "other component", and then the ethylene polymer composition (a') is further blended with the ethylene polymer (c) and/or the ethylene polymer (d).

In another embodiment, in order to obtain the ethylene polymer composition (A'), it is possible that "other component" is blended into the ethylene polymer (c) to give an ethylene polymer composition (c') composed of the ethylene polymer (c) and "other component", and then the ethylene polymer composition (c') is further blended with the ethylene polymer (a) and the ethylene polymer (d) to be optionally used.

In still another embodiment, in order to obtain the ethylene polymer composition (A'), it is possible that "other component" is blended into the ethylene polymer (d) to give an ethylene polymer composition (d') composed of the ethylene polymer (d) and "other component", and the ethylene polymer composition (d') is further blended with the ethylene polymer (a) and the ethylene polymer (c) to be optionally used.

In still another embodiment, in order to obtain the ethylene polymer composition (A'), it is possible that "other component" is blended into the ethylene polymer (c) to give an ethylene polymer composition (c') composed of the ethylene polymer (c) and "other component", and "other component" is blended into the ethylene polymer (d) to give an ethylene polymer composition (d') composed of the ethylene polymer (d) and the "other component", and then the ethylene polymer (a) is further blended with the ethylene polymer composition (c') and the ethylene polymer composition (d').

Blending operations described above may be carried out by any of methods including appropriate methods conventionally known. The blending operations may be, for example, dry blending, or dry blending followed by melting, kneading and further an optional operation such as granulating operation. The operations such as melting, kneading and granulating may be carried out by any method.

Substances falling in the "other component" that can be incorporated to the ethylene polymer component (A), the ethylene polymer component (B) and the optional "other thermoplastic resin", may be the same or different from each other.

<Other Thermoplastic Resin>

In the present invention, the ethylene polymer composition (E), containing not just the ethylene polymer component (A) and the ethylene polymer component (B), may further contain a thermoplastic resin which is neither the ethylene polymer component (B) nor the ethylene polymer component (A) (hereinafter "other thermoplastic resin").

By blending "other thermoplastic resin", the ethylene polymer composition (E) obtained as a thermoplastic resin composition has excellent formability and mechanical strength. A blending ratio of a total of the ethylene polymer component (B) and the ethylene polymer component (A) relative to "other thermoplastic resin" is in the range of 99.9/0.1 to 0.1/99.9, preferably 90/10 to 10/90, and further preferably 70/30 to 30/70.

The "other thermoplastic resin" which can be blended into the ethylene polymer composition (E) is not particularly limited as long as being a thermoplastic resin which is neither the ethylene polymer component (B) nor the ethylene polymer component (A). Examples of preferred "other thermoplastic resin" include crystalline thermoplastic resins such as polyolefin, polyamide, polyester and polyacetal, and non-crystalline thermoplastic resins such as polystyrene, an acrylonitrile/butadiene/styrene copolymer (ABS), polycarbonate, polyphenylene oxide or polyacrylate. Furthermore, polyvinyl chloride is suitably used.

Specific examples of the polyolefin include ethylene polymers, propylene polymers, butene polymers, 4-methyl-1-pentene polymers, 3-methyl-1-butene polymers, and hexene polymers. Among these, ethylene polymers, propylene polymers, and 4-methyl-1-pentene polymer are preferred. When ethylene polymers are employed, the ethylene polymers according to the present invention, conventional ethylene polymers, or ethylene/polar group-containing vinyl copolymers can be used; however, conventional ethylene polymers are more preferred.

Specific examples of the polyester include aromatic polyesters such as polyethylene terephthalate, polyethylene naphthalate, and polybutylene terephthalate; polycaprolactone; and polyhydroxybutyrate.

Specific examples of the polyamide include aliphatic polyamides, such as nylon-6, nylon-66, nylon-10, nylon-12, and nylon-46, and aromatic polyamides synthesized from aromatic dicarboxylic acids and aliphatic diamines.

Specific examples of the polyacetal include polyformaldehyde (polyoxymethylene), polyacetaldehyde, polypropionaldehyde, and polybutyraldehyde. Among these, polyformaldehyde is particularly preferred.

The polystyrene may be either a styrene homopolymer or a binary copolymer of styrene and acrylonitrile, methyl methacrylate, or α-methylstyrene.

A preferred example of the ABS is an ABS containing 20 to 35 mol % of a structural unit derived from acrylonitrile, 20 to 30 mol % of a structural unit derived from butadiene, and 40 to 60 mol % of a structural unit derived from styrene.

Examples of the polycarbonate include polymers which can be obtained from bis(4-hydroxyphenyl)methane, 1,1-bis (4-hydroxyphenyl) ethane, 2,2-bis(4-hydroxyphenyl)propane, and 2,2-bis(4-hydroxyphenyl)butane. Among these, a polycarbonate which can be obtained from 2,2-bis(4-hydroxyphenyl)propane is particularly preferred.

A preferred example of the polyphenylene oxide is poly (2,6-dimethyl-1,4-phenylene oxide).

Preferred examples of the polyacrylate include polymethyl methacrylate and polybutyl acrylate.

The above-mentioned thermoplastic resins may be used solely or in combination. In particular, the thermoplastic resin is preferably polyolefin, and more preferably an ethylene polymer.

In the present invention, "other thermoplastic resin" as it is may be used in the production of the ethylene polymer composition (E). In order to inhibit variation in properties, "other thermoplastic resin" may be blended with the "other component" to provide "other thermoplastic resin composition" composed of "other thermoplastic resin" and "other component" and thereby may be used in the production of the ethylene polymer composition (E).

The "other thermoplastic resin composition" can be obtained by blending "other thermoplastic resin" or a mixture of two or more kinds of "other thermoplastic resin" with "other component". In use of two or more kinds of "other thermoplastic resin", it is possible that each of the "other thermoplastic resins" is blended with "other component" to provide the corresponding thermoplastic resin composition, and then these thermoplastic resin compositions are further blended with each other. Alternatively, in order to provide "other thermoplastic resin composition", it is possible that a first "other thermoplastic resin" is blended with "other component" to give the corresponding thermoplastic resin composition, and the corresponding thermoplastic resin composition is further blended with a second "other thermoplastic resin".

Any of the blending operations described above can be performed by any of methods including appropriate methods conventionally known. Blending operations described above may be, for example, dry blending, or dry blending followed by melting, kneading and further an optional operation such as granulating operation.

<Other Component>

The ethylene polymer composition (E) of the present invention may further contain additives without departing from the object of the present invention, such as a weathering stabilizer, a thermal stabilizer, an antistatic agent, an anti-slip agent, an anti-blocking agent, an antifogging agent, a lubricant, a pigment, a dye, a nucleating agent, a plasticizer, an age resistor, a hydrochloric acid absorbent and an antioxidant.

The total amount of these "other component" is typically not more than 10 parts by weight, preferably not more than 1 part by weight, and more preferably not more than 0.5 part by weight, relative to 100 parts by weight of all the components, excluding the "other component", constituting the ethylene polymer composition (E).

The blending of the "other component" may come after the ethylene polymer component (A), the ethylene polymer component (B) and the optional "other thermoplastic resin" are each separately obtained as described above. Alternatively, the "other component" may be blended during the production process of each of the ethylene polymer component (A), the ethylene polymer component (B) and the optional "other thermoplastic resin". The blending of "other component" may be carried out both during the production process of each of the ethylene polymer component (A), the ethylene polymer component (B) and the optional "other thermoplastic resin", and during mixing the ethylene polymer component (A), the ethylene polymer component (B) and the like with each other. In the blending, the same or different substances may be used as the "other component" that can be blended into the ethylene polymer component (A), the ethylene polymer component (B), the optional "other thermoplastic resin" and a mixture of these as well as into the ethylene polymer (a), the ethylene polymer (c) and the ethylene polymer (d) each of which is capable of constituting the ethylene polymer component (A).

[Production Process of Ethylene Polymer Composition (E)]

The ethylene copolymer composition (E) according to the present invention can be provided by obtaining separately the ethylene polymer component (A), the ethylene polymer component (B) and the "other thermoplastic resin" which is optionally used and then blending these components together with the "other component" as needed by appropriate methods including conventionally known methods.

Instead of the ethylene polymer component (A), the ethylene polymer composition (A') composed of the ethylene polymer component (A) and the "other component" may be used; and instead of the ethylene polymer component (B), the ethylene polymer composition (B') composed of the ethylene polymer component (B) and the "other component" may be used. If the ethylene copolymer composition (E) further containing the "other thermoplastic resin" is obtained, the "other thermoplastic resin" may be replaced by "other thermoplastic resin composition" composed of the "other thermoplastic resin" and the "other component".

Specific methods preferred for blending include dry-blending method using a Henschel mixer, a tumbler blender, a V-blender or the like, and dry-blending followed by melt-kneading using a single-screw extruder, a multi-screw extruder, a Banbury mixer or the like. The blending involving the melt-kneading is preferred since by doing so, the resultant biaxially-stretched film tends to have excellent appearance. From the viewpoints such as economic efficiency and process efficiency, a single screw extruder and/or a twin screw extruder are preferably employed.

In providing the ethylene copolymer composition (E) according to the present invention, the ethylene polymer component (A) and the ethylene polymer component (B) each may be polymerized by continuous and multi-stage polymerization process using multiple polymerization devices and thereafter mixed with each other. Polymerization methods may be any of various known methods.

[Biaxially-Stretched Film]

The biaxially-stretched film of the present invention is obtained from the ethylene polymer composition (E). The biaxially-stretched film can be obtained, for example, by forming the ethylene polymer composition (E) into a raw fabric film by known appropriate methods and then biaxially stretching the raw fabric film. The biaxially-stretched film of the present invention has the following features (1) and (2).

(1) Stretching Temperature Range

The biaxially-stretched film of the present invention is characterized by broad stretching temperature range. The stretching temperature range is evaluated by methods described in Examples set forth later.

The biaxially-stretched film of the present invention generally has a stretching temperature range of 1 to 10° C., and preferably 4 to 8° C.

(2) Thickness Accuracy

The biaxially-stretched film of the present invention is characterized by excellent thickness accuracy. The thickness accuracy can be evaluated by measuring thicknesses of a target biaxially-stretched film at its multiple points, determining standard deviation σ and average thickness x of these thicknesses, and then determining a value represented by 2σ/x. The thickness can be measured, for example, by cutting the biaxially-stretched film to A3 size and measuring thickness at 45 points in the longitudinal direction and at 45 points in the transverse direction.

While evaluation of thickness accuracy may be either about the longitudinal direction (MD) or about the transverse direction (TD), evaluation carried out in Examples provided below in order to more precisely reflect precision in both the directions is preferred: namely a thickness accuracy in the longitudinal direction ($A_{MD}$) and a thickness accuracy in the transverse direction ($A_{TD}$) are each determined; a geometric mean value thereof (i.e., $(A_{MD} \times A_{TD})^{1/2}$) is calculated and is defined as thickness accuracy of the whole film.

The biaxially-stretched film of the present invention has a thickness accuracy which is generally 5 to 15%, preferably 7 to 12%, and further preferably 7 to 10%.

Reason for the above features of the biaxially-stretched film of the present invention is presumed by the present inventors in the following manner.

Presumption regarding the stretching temperature range is that the broadness of density (lamella thickness) distribution of the ethylene polymer composition (E) of the present invention causes the viscosity change of its raw fabric for stretching to be insensitive to temperature and thereby stretching temperature range is broadened. Further, entanglements formed between molecular structures fulfilling the formulae defined for the ethylene polymer component (B) and molecular structures fulfilling the MFR range defined for the ethylene polymer component (A) have a long relaxation time, which broadens stretching temperature range.

The relaxation time refers to a relaxation time at low frequency which is given from melt viscoelasticity data. Specifically, a relaxation time t can be determined from the following Equation (Eq-7) using a storage modulus G', a loss modulus G" and a frequency co.

$$t = G'/(\omega \cdot G'') \qquad \text{(Eq-7)}$$

A relaxation time that can be used in the present invention is, for example, a value to be given when co is 0.01 sec$^{-1}$, as will be shown in Examples provided below.

Long relaxation time means that many points of molecular chains are entangled and the entangling is less likely to come apart with a result that a raw fabric for stretching has increased viscosity. This is believed to be the reason why film hanging is prevented even at high temperature and stretching is possible in a broader temperature range.

Regarding the thickness accuracy, the entanglements formed between molecular structures fulfilling the formulae defined for the ethylene polymer component (B) and molecular structures fulfilling the MFR range defined for the ethylene polymer component (A) have a long relaxation time, which means that the raw fabric has increased viscosity at the stretching step. Since molecular chains do not come apart from each other even at a later stage of the stretching, the raw fabric has an increased tension at a later stage of the stretching. Consequently, a stretching ratio-tension curve rising level (stress at a later stage of stretching/yield stress) is large, advantageously leading to the exhibition of thickness accuracy.

Inferior thickness accuracy results from the fact that thinner parts of the film are preferentially drawn since stress applied to thicker parts of the film is always lower than stress applied to thinner parts of the film. The thickness accuracy is improved when stretching ratio—stress curve rising level (stress at a later stage of stretching/yield stress) is large, in which case thinner parts of the film (where stretching ratio is high) require higher stretching stress and are less likely to be drawn.

As described above, the ethylene polymer component (B), where [η] and Mw are under specific relation, is believed to have long-chain branching. The present inventors presume as follows. When the ethylene polymer component (B) is present solely not together with the ethylene polymer component (A), the ethylene polymer component (B) includes no solid entanglements formed between molecular chains having long-chain branching because of their steric hindrance; but instead includes, as primary components, entanglements loosely formed between the molecular chains having long-chain branching, and entanglements formed between the molecular chains having long-chain branching and low molecular substances having no long-chain branching probably present together with the molecular chains having long-chain branching (MFR≥100 g/10 min), the primary components being the least likely to be relaxed in the ethylene polymer component (B).

When the ethylene polymer component (B) is blended with the ethylene polymer component (A) having the specific melt flow rate, entanglements are newly formed between the molecular chains having long-chain branching of the ethylene polymer component (B) and linear molecular chains of the ethylene polymer component (A), becoming components the least likely to be relaxed. For this reason, the biaxially-stretched film of the present invention is considerably improved in temperature range for its stretching and in thickness accuracy.

While possibility cannot be denied that the ethylene polymer component (B) includes also the same component present in the linear polymer component constituting the ethylene polymer component (A), it is believed that the proportion of that component in the ethylene polymer component (B) is relatively low and thus the ethylene polymer component (B) is unlikely to exhibit the effect described above resultant from the entangling between the molecular chains having long-chain branching and the linear molecular chains.

In order to allow the biaxially-stretched ethylene polymer film of the present invention to have improved printing property or adhesion to other films including a base material layer described below, surface of the film may undergo, for example, surface activation treatments such as corona treatment, flame treatment, plasma treatment and undercoating treatment.

While the biaxially-stretched ethylene polymer film of the present invention may be used as a single layer, the biaxially-stretched ethylene polymer film may be laminated with a film base material, e.g., base material in the form of a sheet or a film which is composed of a thermoplastic resin, or a base material layer composed of paper, an aluminum foil or the like. If the thermoplastic resin is used as the film base material, various known thermoplastic resins can be mentioned, such as polyolefin (e.g., polyethylene, polypropylene, poly-4-methyl-1-pentene, polybutene), polyester (e.g., polyethylene terephthalate, polybutylene terephthalate, polyethylene naphthalate), polyamide (e.g., nylon-6, nylon-66, polymetaxylene adipamide), polyvinyl chloride, polyimide, ethylene.vinyl acetate copolymer or saponification products thereof, polyvinyl alcohol, polyacrylonitrile, polycarbonate, polystyrene, ionomers, and mixtures formed by any of these.

Preferred examples among these are thermoplastic resins having good stretchability and transparency, such as polypropylene, polyethylene terephthalate and polyamide.

The film base material formed from any of such thermoplastic resin films may be an unstretched film or a stretched film, and may be a laminate obtained by one or two or more kinds of co-extrusion molding, extrusion lamination, dry lamination, thermal lamination and the like. Preferred are biaxially-stretched thermoplastic films; in particular those formed from any of polypropylene, polyethylene terephthalate and polyamide.

[Process for Producing Biaxially-Stretched Film]

The biaxially-stretched film of the present invention can be obtained by biaxial stretching in the longitudinal direction (MD) and in the transverse direction (TD) in the above-mentioned range by various known methods including tubular method or flat method (tenter method). The biaxial stretching may be simultaneous biaxial stretching or may be sequential biaxial stretching. Among these methods, the biaxially-stretched ethylene polymer film obtained by flat method is preferred because of being much superior in transparency.

The biaxially-stretched film, if obtained by flat method, is given usually by stretching a sheet obtained by extrusion molding at a temperature range of 90 to 125° C. in the longitudinal direction and thereafter stretching the sheet at a temperature range of 90 to 130° C. in the transverse direction. After the biaxial stretching, the film may be heat-set at a temperature range of 80 to 140° C. depending on uses. The heat-setting temperature can be varied according to a targeted shrinkage ratio.

Regarding stretching ratio, a stretching ratio in either MD or TD is generally in the range of from 3 to 14 and preferably in the range of from 5 to 10, and a stretching ratio in the other direction is generally in the range of from 3 to 14 and preferably in the range of from 5 to 10.

EXAMPLES

The present invention will now be described further in detail with reference to Examples but is not limited thereto. Various test methods and evaluation methods in the present invention are as follows.

<Melt Flow Rate (MFR)>

Measurement was carried out at 190° C. under a load of 2.16 kg (kgf) in accordance with ASTM D 1238-89.

<Density>

A measurement sample was heat-treated at 120° C. for 1 hour, and gradually cooled linearly to room temperature over a period of 1 hour. In accordance with JIS K 7112, the density of the sample was measured by density gradient tube method.

<Number of Methyl Branches and Number of Ethyl Branches>

The number of methyl branches and the number of ethyl branches were obtained by analyzing a $^{13}$C-NMR spectrum with a nuclear magnetic resonance apparatus ECP500 (500 MHz) manufactured by JEOL Ltd.

Into a commercially available quartz glass tube used for NMR analysis and having a diameter of 10 mm, 250 to 400 mg of an ethylene polymer and 3 ml of a mixed solvent of o-dichlorobenzene (manufactured by Wako Pure Chemical Industries, Ltd., special grade) and deuterated benzene (manufactured by ISOTEC) (o-dichlorobenzene:deuterated benzene=5:1 (v/v)) were put, and the content was heated at 120° C. to uniformly disperse the sample.

Integration was carried out 10000 times to 30000 times.

Absorption in a NMR spectrum was assigned in accordance with Kagaku Ryouiki Zoukan vol. 141 *NMR-Sousetsu to Jikken Guide [I]*; p. 132 and 133. In particular, the number of methyl branches per 1000 carbon atoms constituting the polymer chain was calculated from an integrated intensity ratio of absorption of methyl groups derived from the methyl branching (19.9 ppm) to the integral sum of absorption observed in the range of 5 to 45 ppm. The number of ethyl branches was calculated from an integrated intensity ratio of absorption of ethyl groups derived from the ethyl branching (10.8 ppm) to the integral sum of absorption observed in the range of 5 to 45 ppm.

The peak of the main chain methylene (29.97 ppm) was employed as the chemical shift reference.

<Shear Viscosity ($\eta^*$)>

Shear viscosity [$\eta^*(1.0)$] (P) at 200° C. and an angular velocity of 1.0 rad/sec was measured as follows.

In order to define a shear viscosity ($\eta^*$), the angular velocity [$\omega$(rad/sec)] variance of shear viscosity at a measurement temperature of 200° C. ($\eta^*$) was measured in the range of $0.02512 \leq \omega \leq 100$. A Dynamic Stress Rheometer SR-5000 manufactured by Rheometric Scientific was used in the measurement, a parallel plate having a size of 25 mm in diameter was used as a sample holder, and the thickness of a sample was approximately 2.0 mm. The measurement was carried out at five points per digit of $\omega$. The strain amount was appropriately selected from the range of 3 to 10% so as to enable detection of torque in the measurement range and so as to avoid torque over.

The sample used in the measurement of shear viscosity was produced by press-forming with a press-forming machine manufactured by SHINTO Metal Industries Corporation under the following conditions so as to have a thickness of 2 mm: preheating temperature of 190° C., preheating time of 5 minutes, heating temperature of 190° C., heating time of 2 minutes, heating pressure of 100 kgf/cm$^2$, cooling temperature of 20° C., cooling time of 5 minutes, and cooling pressure of 100 kgf/cm$^2$.

<Zero Shear Viscosity ($\eta_0$)>

Zero shear viscosity ($\eta_0$) (P) at 200° C. was determined as follows.

The angular velocity $\omega$ (rad/sec) variance of shear viscosity ($\eta^*$) was measured at a measurement temperature of 200° C. in the range of 0.02512 w 100. A Dynamic Stress Rheometer SR-5000 manufactured by Rheometric Scientific was used in the measurement, a parallel plate having a size of 25 mm in diameter was used as a sample holder, and the thickness of a sample was approximately 2.0 mm. The measurement was carried out at five points per digit of w. The strain amount was appropriately selected from the range of 3 to 10% so as to enable detection of torque in the measurement range and so as to avoid torque over.

The sample used in the measurement of shear viscosity was produced by press-forming with a press-forming machine manufactured by SHINTO Metal Industries Corporation under the following conditions so as to have a thickness of 2 mm: preheating temperature of 190° C., preheating time of 5 minutes, heating temperature of 190°

C., heating time of 2 minutes, heating pressure of 100 kgf/cm², cooling temperature of 20° C., cooling time of 5 minutes, and cooling pressure of 100 kgf/cm².

Zero shear viscosity ($\eta_0$) was calculated by fitting the Carreau model represented by Equation (Eq-2) below to an actually obtained rheological curve [angular velocity (w) variance of shear viscosity ($\eta^*$)] by a nonlinear least-squares method.

$$\eta^* = \eta_0 [1+(\lambda\omega)^a]^{(n-1)/a} \tag{Eq-2}$$

wherein $\lambda$ represents a parameter with a dimension of time, and n represents a power law index of a material. The fitting by a nonlinear least-squares method was carried out such that d in Equation (Eq-3) was minimized.

[Math. 2]

$$d = \sum_{\omega=0.02512}^{100} [\text{Log}_{10}\eta_{exp}(\omega) - \text{Log}_{10}\eta_{calc}(\omega)]^2 \tag{Eq-3}$$

In Equation (Eq-3), $\eta_{exp}(\omega)$ represents actually measured shear viscosity, and $\eta_{calc}(\omega)$ represents shear viscosity calculated from the Carreau model.

<Long-Time Relaxation Time>

An apparatus having the following specifications was used for measurement.

Apparatus: MCR301 SN80926214; FW3.51D090908; Slot2 (manufactured by Anton-paar)

Measurement temperature: 160° C.

Strain: 5%,

Frequency: 100 to 0.01 rad/sec

A relaxation time t at a frequency $\omega$ is determined from the following Equation (Eq-7) using storage modulus G' and loss modulus G" (literature: *Film Seizo Process To Seimaku*, Kako Gijutsu, Hinshitu Seigyo, issued in 2008)

$$t = G'/(\omega \cdot G'') \tag{Eq-7}$$

In the following Examples and Comparative Examples, relaxation time to be given when co is 0.01 sec⁻¹ was calculated.

<Number Average Molecular Weight (Mn), Weight Average Molecular Weight (Mw), Molecular Weight Distribution (Mw/Mn)>

Measurement was carried out as follows with a GPC-viscometer (GPC-VISCO) GPC/V2000 manufactured by Waters Corporation.

A guard column used was a Shodex AT-G, analytical columns used were two AT-806 columns, and detectors used were a differential refractometer and a three-capillary viscometer. A column temperature was 145° C., a mobile phase used was o-dichlorobenzene containing 0.3% by weight of BHT as an antioxidant, a flow rate was 1.0 ml/min, and a sample concentration was 0.1% by weight. Standard polystyrene used was manufactured by TOSOH CORPORATION. In calculation of molecular weight, an actual viscosity was calculated with the viscometer and the refractometer, and a number average molecular weight (Mn), a weight average molecular weight (Mw), and a molecular weight distribution (Mw/Mn) were obtained by universal calibration based on the actual viscosity.

<Intrinsic Viscosity [$\eta$]>

Approximately 20 mg of a measurement sample was dissolved in 15 ml of decalin, and the specific viscosity $\eta_{sp}$ was measured in an oil bath at 135° C. Then, 5 ml of a decalin solvent was further added to the decalin solution for dilution, and the specific viscosity $\eta_{sp}$ thereof was measured in the same manner. This dilution was further repeated twice, and the value of $\eta_{sp}/C$ obtained by extrapolating concentration (C) to 0 as specified in Equation (Eq-5) below was determined as the intrinsic viscosity [$\eta$] (unit: dl/g).

$$[\eta] = \lim(\eta_{sp}/C)(C \to 0) \tag{Eq-5}$$

<Temperature at which Stretching was Possible (Forming Temperature Range)>

A sample was molten using a press-forming machine manufactured by SHINTO Metal Industries Corporation at a forming temperature of 190° C. (upper part/lower part). The sample underwent primary pressure application for 5 minutes (degassing: ten times) and secondary pressure application for 5 minutes (50 kgf/cm²). Thereafter, solidifying by cooling was performed at 20° C. for 4 minutes. This resulted in giving a press sheet having a thickness of 1.0 mm. This sheet was cut into a size of 85 mm×85 mm. The cut sheet was sequentially stretched with a biaxial stretching machine (KARO IV manufactured by Brückner) at a stretching ratio of 5 in MD and 8 in TD at a stretching rate of 1 m/min. A temperature range in which stretching was possible (neither film hanging nor film breakage was caused) was determined.

<Stretching Unevenness (Thickness Accuracy)>

A sample was molten using a press-forming machine manufactured by SHINTO Metal Industries Corporation at a forming temperature of 190° C. (upper part/lower part). The sample underwent primary pressure application for 5 minutes (degassing: ten times) and secondary pressure application for 5 minutes (50 kgf/cm²). Thereafter, solidifying by cooling was performed at 20° C. for 4 minutes. This resulted in giving a press sheet having a thickness of 1.0 mm. The sheet was cut into a size of 85 mm×85 mm, and was subjected to a biaxial stretching machine (KARO IV manufactured by Brückner), where the sheet was sequentially stretched at a stretching ratio of 5 in MD and 8 in TD at a stretching rate of 1 m/min, yielding a 25µ film. This film was cut into A3 size. Then, thickness at 45 points in the longitudinal direction and at 45 points in the transverse direction was measured. From the following Equation (Eq-8) using standard deviation $\sigma$ and average thickness x, thickness accuracy A was determined.

$$A = 2\sigma/x \tag{Eq-8}$$

In the following Examples and Comparative Examples, thickness accuracy ($A_{MD}$) in the longitudinal direction (MD) and thickness accuracy ($A_{TD}$) in the transverse direction (TD) were each determined in accordance with Equation (Eq-8), and a geometric mean thereof (i.e., $(A_{MD} \times A_{TD})^{1/2}$) was calculated and defined as a thickness accuracy of the whole film.

The ethylene polymer component (A); constituents thereof, i.e., the ethylene polymer (a), the ethylene polymer (c) and the ethylene polymer (d); and the ethylene polymer component (B), which were used in Examples and Comparative Examples, are set forth below.

[Ethylene Polymer (a-1)]

Preparation of Solid Support (S-1)

In a reactor having an inner volume of 270 liters and equipped with a stirrer, under a nitrogen atmosphere, 10 kg of silica gel (manufactured by Fuji Silysia chemical Ltd.; average particle diameter of 70 µm, specific surface area of 340 m²/g, pore volume of 1.3 cm³/g, and dried at 250° C. for 10 hours) was suspended in 77 liters of toluene, and then the resultant mixture was cooled to 0 to 5° C. To this suspension, 19.4 liters of a toluene solution of methylaluminoxane (3.5 mmol/mL in terms of Al atom) was added dropwise over 30 minutes, during which the temperature inside the system was maintained at 0 to 5° C. The contacting was continued at 0 to 5° C. for 30 minutes. Then, the temperature inside the system was increased to 95° C. over approximately 1.5 hours, and the contacting was continued at 95° C. for 4 hours. Then, the temperature was decreased to normal temperature, the supernatant liquid was removed by decantation, and then washing with toluene was carried out twice to give 115 liters of toluene slurry in total. Part of the obtained slurry component was collected for analysis of concentration, and result of the analysis showed that the slurry concentration was 122.6 g/L and that the Al concentration was 0.62 mol/L.

Preparation of Prepolymerized Catalyst Component (XP-1)

In a reactor having an inner volume of 114 liters and equipped with a stirrer, 10.0 liters of the slurry of the solid support (S-1) obtained above (6.20 mol in terms of Al atom) was fed under a nitrogen atmosphere, and toluene was added thereto such that the whole amount was 28 liters.

Then, 19.15 g of bis(1,3-butylmethylcyclopentadienyl) zirconium dichloride (44.3 mmol in terms of Zr atom) was collected into a 5-liter glass reactor under a nitrogen atmosphere, and dissolved in 5.0 liters of toluene. The solution was fed to the above reactor under pressure.

The contacting was performed with the temperature inside the system at 20 to 25° C. for 1 hour, and then the temperature inside the system was increased to 75° C., and the contacting was further performed for 2 hours. After the temperature was cooled, the supernatant liquid was removed by decantation, washing with hexane was carried out three times, and hexane was added to the product to adjust the total volume to be 30 liters. Thereby, a hexane slurry of a solid catalyst component was given.

Then, the hexane slurry of the solid catalyst component obtained above was cooled to 10° C., and 3.3 mol of diisobutylaluminum hydride (DiBAl-H) was added thereto. Under normal pressure, ethylene was continuously fed into the system for several minutes, during which the temperature inside the system was maintained at 10 to 15° C. Then, 0.42 liter of 1-hexene was added thereto. After the addition of 1-hexene, feeding of ethylene was started, and preliminary polymerization was performed at 32 to 37° C. inside the system. Every 30 minutes after the preliminary polymerization had been started, 0.15 liter of 1-hexene was added five times in total. After a lapse of 180 minutes from the start of the preliminary polymerization, when the quantity of fed ethylene reached three times the weight of the solid catalyst component, the feeding of ethylene was stopped. Then, the supernatant liquid was removed by decantation, washing with hexane was carried out four times, and hexane was added to the product to adjust the total volume to be 50 liters.

Then, a hexane solution of 49.0 g of CHEMISTAT 2500 (manufactured by Sanyo Chemical Industries, Ltd.) was transferred to the above-mentioned reactor under pressure with the temperature inside the system at 34 to 36° C., and the reaction was continued at 34 to 36° C. for 2 hours. Then, the supernatant liquid was removed by decantation, and washing with hexane was carried out four times.

Under a nitrogen atmosphere, the hexane slurry was put into a vaporizing/drying device having an inner volume of 43 liters and equipped with a stirrer. Then, the pressure inside the vaporizing/drying device was reduced to −68 kPaG over approximately 60 minutes. When the pressure reached −68 kPaG, vacuum drying was carried out for approximately 4.3 hours, thereby removing hexane and volatile content in the prepolymerized catalyst component. The pressure was further reduced to −100 kPaG. When the pressure reached −100 kPaG, vacuum drying was carried out for approximately 8 hours, thereby giving 4.9 kg of a prepolymerized catalyst component (XP-1). Part of the prepolymerized catalyst component obtained was collected to analyze the composition thereof, and result of the analysis showed that the Zr atom content per 1 gram of the prepolymerized catalyst component was 0.54 mg.

Production of Ethylene Polymer (a-1)

In a fluidized bed gas phase polymerization reactor having an inner volume of 1.0 m$^3$, the prepolymerized catalyst component (XP-1) was used to produce an ethylene/1-hexene copolymer.

Under conditions shown in Table 1 below, the prepolymerized catalyst component (XP-1), ethylene, nitrogen, 1-hexene, and another material were continuously fed into the reactor.

The polymerization reactant was continuously extracted from the reactor and dried with a drier to yield an ethylene polymer (a-1) powder. The resultant powder was defined as a measurement sample, and its properties were measured. Result is shown in Table 2.

[Ethylene Polymer (a-2)]

Preparation of Solid Support (S-2)

In a reactor having an inner volume of 1.0 liter and equipped with a stirrer, under a nitrogen atmosphere, 73 g of silica gel (manufactured by Grace Davison, Inc.: average particle diameter of 37 μm, specific surface area of 303 m$^2$/g, pore volume of 1.4 cm$^3$/g, calcined at 600° C.) was suspended in 540 milliliters of toluene. The resultant mixture was cooled to 0 to 5° C. To this suspension, 208 milliliters of a toluene solution of methylaluminoxane (2.9 mmol/mL in terms of Al atom) was added dropwise over 30 minutes, during which the temperature inside the system was maintained at 0 to 5° C. The contacting was continued at 0 to 5° C. for 30 minutes. Then, the temperature inside the system was increased to 95° C. over approximately 1.5 hours, and the contacting was continued at 95° C. for 4 hours. Then, the temperature was decreased to normal temperature, the supernatant liquid was removed by decantation, washing with toluene was carried out two times, and thereby a toluene slurry with a total volume of 1000 milliliters was given.

Preparation of Prepolymerized Catalyst Component (XP-2)

In a reactor having an inner volume of 3.0 liters and equipped with a stirrer, 1070 milliliters of toluene, and the whole amount of the solid support obtained above were fed under a nitrogen atmosphere. Then, a toluene solution of 2.25 g (5.05 mmol in terms of Zr atom) of bis(1,3-butylethylcyclopentadienyl)zirconium dichloride was dropwise added, and the contacting was performed for 2 hours with the temperature inside the system at 20 to 25° C. The supernatant liquid was removed by decantation, washing with hexane was carried out two times, and hexane was added to the product to adjust the total volume to be 2.2 liters. Thereby, a slurry of a solid catalyst component was given.

The solid catalyst component slurry obtained above was cooled to 10° C. Then, 252.5 mmol of diisobutylaluminum hydride (DiBAl-H) was added thereto. Under normal pressure, ethylene was continuously fed into the system for several minutes, during which the temperature inside the system was maintained at 10 to 15° C. Then, 4.6 milliliters of 1-hexene was added thereto. After the addition of 1-hexene, feeding of ethylene at 160 liters/h was started, and preliminary polymerization was conducted with the temperature inside the system at 35° C. Then, every 30 minutes after the preliminary polymerization had been started, 4.6 milliliters of 1-hexene was added two times in total. After a lapse of 90 minutes from the start of the preliminary polymerization, when the quantity of fed ethylene reached three times the weight of the solid catalyst component, the feeding of ethylene was stopped. Then, the supernatant liquid was removed by decantation, washing with hexane was carried out four times, and hexane was added to the product to adjust the total volume to be 2 liters. Thereafter, the temperature inside the system was increased to 35° C. Then, a hexane solution of 4.1 g of CHEMISTAT 2500 (manufactured by Sanyo Chemical Industries, Ltd.) was added, and the contacting was performed for 2 hours. Thereafter, the whole amount of the slurry was transferred to a glass filter having an inner volume of 3.0 L, and vacuum drying was carried out thereby removing the solvent, which yielded 455 g of a prepolymerized catalyst component. The resultant prepolymerized catalyst was studied for its composition and result thereof showed that the Zr atom content per 1 gram of the prepolymerized catalyst component was 0.85 mg.

Production of Ethylene Polymer (a-2)

The same operation as in the ethylene polymer (a-1) was performed except that in the production of the ethylene polymer (a-1), the inner volume of the reactor was 1.7 m$^3$ and that the prepolymerized catalyst component and the polymerization conditions were changed as shown in Table 1, yielding an ethylene polymer (a-2). The resultant powder was defined as a measurement sample, and its properties were measured. Result is shown in Table 2.

[Ethylene Polymer (a-3)]

The same operation as in the ethylene polymer (a-1) was performed except that in the production of the ethylene polymer (a-1), the prepolymerized catalyst component and the polymerization conditions were changed as shown in Table 1, yielding an ethylene polymer (a-3). The resultant powder was defined as a measurement sample, and its properties were measured. Result is shown in Table 2.

[Table 1]

TABLE 1

| | | | Ethylene Polymer (a) | | |
|---|---|---|---|---|---|
| | | | a-1 | a-2 | a-3 |
| Polymerization conditions | Prepolymerized catalyst component | Number | XP-1 | XP-2 | XP-1 |
| | Catalyst amount | mmol-Zr/h | 0.042973 | 0.105044 | 0.041438 |
| | Ethylene | Nm$^3$/h | 6.24 | 7.2 | 6.24 |
| | 1-hexene | kg/h | 1.383 | 1.2 | 1.503 |
| | Polymerization temperature | ° C. | 69.2 | 70 | 70 |
| | Polymerization pressure | MPa · G | 1.399 | 1.6 | 1.399 |
| | Ethylene partial pressure | MPa · A | 0.996 | 1.2 | 0.996 |
| | CHEMISTAT 2500 | g/h | 0.36225 | 0 | 0.36225 |
| | Gas linear velocity | m/sec | 0.75 | 0.8 | 0.75 |
| | Residence time | hr | 4.571429 | 4.060914 | 4.571429 |
| | Vapor phase: hydrogen/ethylene ratio | m.r. ($\times 10^{-4}$) | 1.54 | 1 | 2.2 |
| | Vapor phase: 1-hexene/ethylene ratio | m.r. | 0.0258 | 0.027 | 0.029 |

[Ethylene Polymer (c-1)]

An ethylene polymer commercially available from Prime Polymer Co., Ltd. (product name: ULT-ZEX 30501J) was used. The pellet product was defined as a measurement sample, and its properties were measured. Result is shown in Table 2.

[Ethylene Polymer (d-1)]

An ethylene polymer commercially available from Prime Polymer Co., Ltd. (product name: HI-ZEX 3300F) was used. The pellet product was defined as a measurement sample, and its properties were measured. Result is shown in Table 2.

[Ethylene Polymer (d-2)]

An ethylene polymer commercially available from Prime Polymer Co., Ltd. (product name: HI-ZEX 3600F) was used. The pellet product was defined as a measurement sample, and its properties were measured. Result is shown in Table 2.

[Ethylene Polymer Component (A-1)]

The ethylene polymer (a-1) powder was mixed with 500 ppm of SUMILIZER (registered trademark) GP (manufactured by Sumitomo Chemical Co., Ltd.). The mixture was melt-kneaded with a single-screw extruder manufactured by Placo Co., Ltd. (40 mm in diameter) at a temperature of 190° C., and at an extrusion amount of 5 Kg/h, yielding an ethylene polymer composition. The resultant pellet was defined as a measurement sample, and its properties were measured. Result is shown in Table 2.

In Examples 1 to 4 and Comparative Examples 1 to 4 which will be described later, this ethylene polymer composition was used as an ethylene polymer component (A-1).

When there is a mention, for the ethylene polymer component (A-1) and ethylene polymer components (A-2) to (A-5) described later, that an ethylene polymer or an ethylene polymer mixture given by mixing two or more kinds of ethylene polymers was "mixed with X ppm" of an additive, this means that (X/1,000,000) parts by weight of the additive was incorporated to 1 part by weight of "the ethylene polymer or the ethylene polymer mixture given by mixing two or more kinds of ethylene polymers" which contained no additives.

The ethylene polymer components (A-1) to (A-5) used in Examples and Comparative Examples each correspond to the ethylene polymer composition (A') composed of the ethylene polymer component (A) and "other component".

[Ethylene Polymer Component (A-2)]

The ethylene polymer (a-2) powder was mixed with 500 ppm of SUMILIZER (registered trademark) GP (manufactured by Sumitomo Chemical Co., Ltd.). The mixture was melt-kneaded with a single-screw extruder manufactured by Placo Co., Ltd. (40 mm in diameter) at a temperature of 190° C. and at an extrusion amount of 5 Kg/h, yielding an ethylene polymer composition. The resultant pellet was defined as a measurement sample, and its properties were measured. Result is shown in Table 2.

In Example 5 which will be described later, this ethylene polymer composition was used as the ethylene polymer component (A-2).

[Ethylene Polymer Component (A-3)]

The ethylene polymer (a-3) was mixed with the ethylene polymer (c-1) at a ratio of 60:40 (parts by weight) to give an ethylene polymer mixture. The ethylene polymer mixture was mixed with 500 ppm of SUMILIZER (registered trademark) GP (manufactured by Sumitomo Chemical Co., Ltd.), followed by dry blending. The dry-blend was melt-kneaded with a single-screw extruder manufactured by Placo Co., Ltd. (40 mm in diameter) at a temperature of 190° C. and at an extrusion amount of 5 Kg/h, yielding an ethylene polymer composition. The resultant pellet was defined as a measurement sample, and its properties were measured. Result is shown in Table 2.

In Example 8 and Comparative Example 5 which will be described later, this ethylene polymer composition was used as the ethylene polymer component (A-5).

[Table 2]

TABLE 2

| | | | Ethylene Polymer Component (A) | | | | |
|---|---|---|---|---|---|---|---|
| | | | A-1 | A-2 | A-3 | A-4 | A-5 |
| Properties | Melt flow rate (MFR$_A$) | g/10 min | 0.4 | 0.1 | 3.8 | 0.6 | 2.7 |
| | Density (D$_A$) | kg/m$^3$ | 907 | 907 | 915 | 922 | 925 |
| | Mw | — | 151200 | 277500 | 90400 | 134100 | 86600 |
| | [η] | dl/g | 2.43 | 3.27 | 1.51 | 2.30 | 1.63 |
| | [η]/Mw$^{0.776}$ | — | | 0.000233 | 0.000195 | 0.000215 | 0.000242 | 0.000240 |
| Component (a) | Type | | a-1 | a-2 | a-3 | a-1 | a-3 |
| | Amount of component | wt % | 100 | 100 | 60 | 64 | 45 |
| | MFR | g/10 min | 0.4 | 0.1 | 0.6 | 0.4 | 0.6 |
| | Density | kg/m$^3$ | 907 | 907 | 905 | 907 | 905 |
| Component (b) | Type | | — | — | c-1 | — | c-1 |
| | Amount of component | wt % | — | — | 40 | — | 30 |
| | MFR | g/10 min | — | — | 60 | — | 60 |
| | Density | kg/m$^3$ | — | — | 930 | — | 930 |
| Component (c) | Type | | — | — | — | d-1 | d-2 |
| | Amount of component | wt % | — | — | — | 36 | 25 |
| | MFR | g/10 min | — | — | — | 1 | 1 |
| | Density | kg/m$^3$ | — | — | — | 950 | 958 | an extrusion amount of 5 Kg/h, yielding an ethylene polymer composition. The resultant pellet was defined as a measurement sample, and its properties were measured. Result is shown in Table 2.

In Example 6 which will be described later, this ethylene polymer composition was used as the ethylene polymer component (A-3).

[Ethylene Polymer Component (A-4)]

The ethylene polymer (a-1) was mixed with the ethylene polymer (d-1) at a ratio of 64:36 (parts by weight) to give an ethylene polymer mixture. The ethylene polymer mixture was mixed with 500 ppm of SUMILIZER (registered trademark) GP (manufactured by Sumitomo Chemical Co., Ltd.), followed by dry blending. The dry-blend was melt-kneaded with a single-screw extruder manufactured by Placo Co., Ltd. (40 mm in diameter) at a temperature of 190° C. and at an extrusion amount of 5 Kg/h, yielding an ethylene polymer composition. The resultant pellet was defined as a measurement sample, and its properties were measured. Result is shown in Table 2.

In Example 7 which will be described later, this ethylene polymer composition was used as the ethylene polymer component (A-4).

[Ethylene Polymer Component (A-5)]

The ethylene polymer (a-3), the ethylene polymer (c-1) and the ethylene polymer (d-2) were mixed with one another at a proportion of 45:30:25 (parts by weight) to give an ethylene polymer mixture. The ethylene polymer mixture was mixed with 500 ppm of SUMILIZER (registered trademark) GP (manufactured by Sumitomo Chemical Co., Ltd.),

[Ethylene Polymer Component (B-1)]

Preparation of Prepolymerized Catalyst Component (XP-3)

In a reactor having an inner volume of 114 liters and equipped with a stirrer, 12.2 liters of the slurry of the solid support (S-1) (7.56 mol in terms of Al atom) described in the prepolymerized catalyst component (XP-1) was fed under a nitrogen atmosphere, and toluene was added thereto such that the whole amount was 28 liters.

Then, 2.95 g of dimethylsilylene(3-n-propylcyclopentadienyl)(cyclopentadienyl) zirconium dichloride (7.6 mmol in terms of Zr atom) and 16.47 g of isopropylidene(cyclopentadienyl) (2,7-di-t-butyl-9-fluorenyl)zirconium dichloride (30.2 mmol in terms of Zr atom) were collected into a 5-liter glass reactor under a nitrogen atmosphere, and dissolved in 5.0 liters of toluene. The solution was fed to the above reactor under pressure.

The contacting was performed for 1 hour with the temperature inside the system at 20 to 25° C., and then the temperature inside the system was increased to 75° C., and the contacting was further performed for 2 hours. After the temperature was cooled, the supernatant liquid was removed by decantation, washing with hexane was carried out three times, and hexane was added to the product to adjust the total volume to be 30 liters. Thereby, a hexane slurry of solid catalyst component was given.

Subsequently, the hexane slurry of the solid catalyst component obtained above was cooled to 10° C., and 3.8 mol of diisobutylaluminum hydride (DiBAl-H) was added thereto. Under normal pressure, ethylene was continuously fed into the system for several minutes, during which the temperature inside the system was maintained at 10 to 15° C. Then, 0.15 liter of 1-hexene was added thereto. After the addition of 1-hexene, feeding of ethylene was started, and preliminary polymerization was performed at 32 to 37° C. inside the system. Then, every 30 minutes after the preliminary polymerization had been started, 0.15 liter of 1-hexene was added five times in total. After a lapse of 180 minutes from the start of the preliminary polymerization, when the quantity of fed ethylene reached three times the weight of the solid catalyst component, the feeding of ethylene was stopped. Then, the supernatant liquid was removed by decantation, washing with hexane was carried out four times, and hexane was added to the product to adjust the total volume to be 50 liters.

Then, a hexane solution of 59.8 g of CHEMISTAT 2500 (manufactured by Sanyo Chemical Industries, Ltd.) was transferred to the above-mentioned reactor under pressure with the temperature inside the system at 34 to 36° C., and the reaction was continued at 34 to 36° C. for 2 hours. Then, the supernatant liquid was removed by decantation, and washing with hexane was carried out four times.

Under a nitrogen atmosphere, the hexane slurry was put into a vaporizing/drying device having an inner volume of 43 liters and equipped with a stirrer. Then, the pressure inside the drying device was reduced to −68 kPaG over approximately 60 minutes. When the pressure reached −68 kPaG, vacuum drying was carried out for approximately 4.3 hours, thereby removing hexane and volatile content in the prepolymerized catalyst component. The pressure was further reduced to −100 kPaG. When the pressure reached −100 kPaG, vacuum drying was carried out for approximately 8 hours, thereby giving 6.0 kg of a prepolymerized catalyst component (XP-1). Part of the prepolymerized catalyst component was collected to analyze the composition thereof, and result of the analysis showed that the Zr atom content per 1 gram of the prepolymerized catalyst component was 0.54 mg.

Production of Ethylene Polymer Component (B-1)

In a fluidized bed gas phase polymerization reactor having an inner volume of 1.7 m³, the prepolymerized catalyst component (XP-3) was used to produce an ethylene/1-hexene copolymer.

Under conditions shown in Table 3, the prepolymerized catalyst component (XP-3), ethylene, nitrogen, 1-hexene, and another material were continuously fed into the reactor. The polymerization reactant was continuously extracted from the reactor and dried with a drier to yield an ethylene polymer powder. The resultant powder was defined as a measurement sample, and its properties were measured. Result is shown in Table 5.

In Examples 1, 2, 5 and 7 and Comparative Examples 1 and 2 which will be described later, this ethylene polymer powder was used as an ethylene polymer component (B-1).

[Ethylene Polymer Component (B-2)]

The same operation as in the ethylene polymer component (B-1) was performed except that in the production of the ethylene polymer component (B-1), the polymerization conditions were changed to conditions shown in Table 3, yielding an ethylene polymer powder. The resultant powder was defined as a measurement sample, and its properties were measured. Result is shown in Table 5.

In Example 3 which will be described later, this ethylene polymer powder was used as an ethylene polymer component (B-2).

[Ethylene Polymer Component (B-3)]

Preparation of Prepolymerized Catalyst Component (XP-4)

In a reactor having an inner volume of 114 liters and equipped with a stirrer, 12.0 liters of the slurry of the solid support (S-1) (7.44 mol in terms of Al atom) was fed under a nitrogen atmosphere, and toluene was added thereto such that the whole amount was 28 liters.

Then, 6.83 g of dimethylsilylene(3-n-propylcyclopentadienyl)(cyclopentadienyl) zirconium dichloride (17.5 mmol in terms of Zr atom) and 10.74 g of isopropylidene(cyclopentadienyl) (2,7-di-t-butyl-9-fluorenyl)zirconium dichloride (19.7 mmol in terms of Zr atom) were collected into a 5-liter glass reactor under a nitrogen atmosphere, and dissolved in 5.0 liters of toluene. The solution was fed to the above reactor under pressure.

The contacting was performed for 2 hours with the temperature inside the system at 20 to 25° C. Thereafter, the supernatant liquid was removed by decantation, washing with hexane was carried out three times, and hexane was added to the product to adjust the total volume to be 30 liters. Thereby, a hexane slurry of a solid catalyst component was given.

Subsequently, preliminary polymerization was performed in the same manner as in the prepolymerized catalyst component (XP-3) except that diisobutylaluminum hydride (DiBAl-H) was added in an amount of 1.5 mol, 1-hexene was added in a total amount of 0.28 liter and CHEMISTAT 2500 was added in an amount of 14.7 g, which yielded 5.9 Kg of a prepolymerized catalyst component (XP-4).

Production of Ethylene Polymer Component (B-3)

The same operation as in the ethylene polymer component (B-1) was performed except that in the production of the ethylene polymer component (B-1), the prepolymerized catalyst component and the polymerization conditions were changed as shown in Table 3, which yielded an ethylene polymer powder. The resultant powder was defined as a measurement sample, and its properties were measured. Result is shown in Table 5.

In Example 4 which will be described later, this ethylene polymer powder was used as an ethylene polymer component (B-3).

[Ethylene Polymer Component (B-4)]

Preparation of Prepolymerized Catalyst Component (XP-5)

The same operation as in the prepolymerized catalyst component (XP-3) was performed except that the solid support (S-1) slurry was used at 10.5 liters (6.51 mol in terms of Al atom), and that as a metallocene component, 3.56 g of dimethylsilylene(3-n-propylcyclopentadienyl)(cyclopentadienyl) zirconium dichloride (9.1 mmol in terms of Zr atom) and 12.77 g of isopropylidene(cyclopentadienyl) (2,7-di-t-butyl-9-fluorenyl)zirconium dichloride (23.4 mmol in terms of Zr atom) were used, so that a hexane slurry of a solid catalyst component was given.

Subsequently, preliminary polymerization was performed in the same manner as in the prepolymerized catalyst component (XP-3), except that diisobutylaluminum hydride (DiBAl-H) was added in an amount of 1.5 mol, 1-hexene was added in a total amount of 0.22 liter and CHEMISTAT 2500 was added in an amount of 51.5 g, which yielded 5.1 Kg of a prepolymerized catalyst component (XP-5).

Production of Ethylene Polymer Component (B-4)

The same operation as in the ethylene polymer component (B-1) was performed except that in the production of the ethylene polymer component (B-1), the prepolymerized catalyst component and the polymerization conditions were changed as shown in Table 3, yielding an ethylene polymer powder. The resultant powder was defined as a measurement sample, and its properties were measured. Result is shown in Table 5.

In Example 6 which will be described later, this ethylene polymer powder was used as an ethylene polymer component (B-4).

[Ethylene Polymer Component (B-5)]
Preparation of Prepolymerized Catalyst Component (XP-6)

The same operation as in the prepolymerized catalyst component (XP-4) was performed except that the solid support (S-1) slurry was used at 10.0 liters (6.20 mol in terms of Al atom), and that as a metallocene component, 5.02 g of dimethylsilylene(3-n-butylcyclopentadienyl)(cyclopentadienyl) zirconium dichloride (12.4 mmol in terms of Zr atom) and 10.13 g of isopropylidene(cyclopentadienyl) (2,7-di-t-butyl-9-fluorenyl)zirconium dichloride (18.6 mmol in terms of Zr atom) were used, so that a hexane slurry of a solid catalyst component was given.

Subsequently, preliminary polymerization was performed in the same manner as in the prepolymerized catalyst component (XP-3) except that diisobutylaluminum hydride (DiBAl-H) was added in an amount of 1.2 mol, 1-hexene was added in a total amount of 0.21 liter and CHEMISTAT 2500 was added in an amount of 12.3 g, which yielded 4.9 Kg of a prepolymerized catalyst component (XP-6).

Production of Ethylene Polymer Component (B-5)

The same operation as in the ethylene polymer component (B-1) was performed except that in the production of the ethylene polymer component (B-1), the prepolymerized catalyst component and the polymerization conditions were changed as shown in Table 3, which yielded an ethylene polymer powder. The resultant powder was defined as a measurement sample, and its properties were measured. Result is shown in Table 5.

In Example 8 which will be described later, this ethylene polymer powder was used an ethylene polymer component (B-5).

[Table 3]

was maintained at 0 to 5° C. The contacting was continued at 0 to 5° C. for 30 minutes, the temperature inside the system was increased to 95° C. over approximately 1.5 hours, and the contacting was continued at 95° C. for 4 hours. Then, the temperature was decreased to normal temperature, the supernatant liquid was removed by decantation, washing with toluene was carried out two times, and thereby a toluene slurry with a total volume of 130 liters was prepared. Part of the obtained slurry component was collected for analysis of its concentration, and result of the analysis showed that the slurry concentration was 137.5 g/L and that the Al concentration was 1.00 mol/L.

Preparation of Prepolymerized Catalyst Component (XP-7)

The same operation as in the prepolymerized catalyst component (XP-3) was performed except that the slurry of the solid support (S-3) was used at 8.7 liters (8.70 mol in terms of Al atom), and that as a metallocene component, 12.88 g of dimethylsilylenebis(cyclopentadienyl)zirconium dichloride (37.0 mmol in terms of Zr atom) and 2.82 g of isopropylidene(cyclopentadienyl)(fluorenyl)zirconium dichloride (6.5 mmol in terms of Zr atom) were used, so that a hexane slurry of a solid catalyst component was given.

Subsequently, the hexane slurry of the solid catalyst component obtained above was cooled to 10° C. Then, with the temperature kept at 10 to 15° C., ethylene was continuously fed into the system for several minutes under normal pressure. Thereafter, 1.6 mol of triisobutylaluminum (TiBAl) was added thereto, and then 0.16 liter of 1-hexene was added thereto. After the addition of 1-hexene, feeding of ethylene was resumed, and preliminary polymerization was performed with the temperature inside the system at 24 to 26° C. Every 60 minutes after the preliminary polymerization had been started, 0.08 liter of 1-hexene was added two times in total. After a lapse of 240 minutes from the start of the preliminary polymerization, when the quantity of fed

TABLE 3

| | | | Ethylene Polymer Component (B) | | | | |
|---|---|---|---|---|---|---|---|
| | | | B-1 | B-2 | B-3 | B-4 | B-5 |
| Polymerization conditions | Prepolymerized catalyst component | Number | XP-3 | XP-3 | XP-4 | XP-5 | XP-6 |
| | Catalyst amount | mmol-Zr/h | 0.027724 | 0.027038 | 0.024585 | 0.043049 | 0.028595 |
| | Ethylene | Nm3/h | 7.62 | 7.98 | 6 | 6.7 | 5.7 |
| | 1-hexene | kg/h | 0.75 | 0.57 | 0.39 | 0.55 | 0.41 |
| | Polymerization temperature | ° C. | 80 | 80 | 80 | 80 | 80 |
| | Polymerization pressure | MPa · G | 2 | 2 | 2 | 2 | 2 |
| | Ethylene partial pressure | MPa · A | 1.5 | 1.5 | 1.2 | 1.2 | 1.2 |
| | CHEMISTAT 2500 | g/h | 0.13 | 0.13 | 0 | 0 | 0 |
| | Gas linear velocity | m/sec | 0.7 | 0.7 | 0.7 | 0.7 | 0.7 |
| | Residence time | hr | 4.137931 | 4.571429 | 6.486486 | 4.571429 | 6.857143 |
| | Vapor phase: hydrogen/ethylene ratio | m.r. ($\times 10^{-4}$) | 30 | 30 | 10 | 25 | 16 |
| | Vapor phase: 1-hexene/ethylene ratio | m.r. | 0.0099 | 0.005 | 0.0062 | 0.0068 | 0.00786 |

[Ethylene Polymer Component (B-6)]
Preparation of Solid Support (S-3)

In a reactor having an inner volume of 270 liters and equipped with a stirrer, under a nitrogen atmosphere, 10 kg of silica gel (manufactured by Asahi Glass Co., Ltd.; average particle diameter of 12 μm, specific surface area of 760 m²/g, pore volume of 0.7 cm³/g, and dried at 180° C. for 4 hours) was suspended in 90 liters of toluene, and then the resultant mixture was cooled to 0 to 5° C. To this suspension, 45.5 liters of a toluene solution of methylaluminoxane (3.0 mmol/mL in terms of Al atom) was added dropwise over 30 minutes, during which the temperature inside the system ethylene reached three times the weight of the solid catalyst component, the feeding of ethylene was stopped. Then, the supernatant liquid was removed by decantation, washing with hexane was carried out four times, and hexane was added to the product to adjust the total volume to be 65 liters, so that a hexane slurry of prepolymerized catalyst component (XP-5) was obtained. Part of the slurry component obtained was collected to study its concentration, and the result of the study showed that the slurry concentration was 74.8 g/L, and Zr concentration was 0.65 mmol/L.

Production of Ethylene Polymer Component (B-6)

In a complete-stirring/mixing polymerization device having an inner volume of 290 L, the prepolymerized catalyst component (XP-7) was used to produce an ethylene polymer under conditions described in Table 4.

Specifically, a polymerization tank was continuously charged with hexane solvent at 45 L/h, the prepolymerized catalyst at 0.36 mmol/h in terms of Zr atom, triisobutylaluminum at 20.0 mmol/h, ethylene at 8.0 kg/h and 1-hexene at 0.65 kg/h. A polymer slurry was continuously extracted from the polymerization tank such that a solvent amount in the polymerization tank was constant. Polymerization was performed under a total pressure of 0.8 MPa-G, a polymerization temperature of 80° C., a residence time of 2.5 h, and at a vapor-phase hydrogen/ethylene ratio of 0.0065 m.r., wherein "m.r." indicates a molar ratio. The polymer slurry continuously extracted from the polymerization tank is subjected to a flash drum, where unreacted ethylene was substantially removed. Thereafter, hexane in the polymer slurry was removed with a solvent separation device, and drying was carried out. As a result, an ethylene polymer powder was obtained. The resultant powder was defined as a measurement sample, and its properties were measured. Result is shown in Table 5.

In Comparative Example 3 which will be described later, this ethylene polymer powder was used as an ethylene polymer component (B-6).

[Ethylene Polymer Component (B-7)]
Preparation of Prepolymerized Catalyst Component (XP-8)

The same operation as in the prepolymerized catalyst component (XP-4) was performed except that the solid support (S-3) slurry was used at 8.7 liters (8.70 mol in terms of Al atom) and that as a metallocene component, 14.40 g of dimethylsilylenebis(cyclopentadienyl)zirconium dichloride (41.3 mmol in terms of Zr atom) and 0.94 g of isopropylidene(cyclopentadienyl) (fluorenyl)zirconium dichloride (2.2 mmol in terms of Zr atom) were used, so that a hexane slurry of a solid catalyst component was given.

Subsequently, preliminary polymerization was performed in the same manner as in the prepolymerized catalyst component (XP-7), which yielded a hexane slurry of prepolymerized catalyst component (XP-8). Part of the slurry component obtained was collected to study its concentration, and result of the study showed that the slurry concentration was 73.8 g/L and Zr concentration was 0.67 mmol/L.

Production of Ethylene Polymer Component (B-7)

The same operation as in the ethylene polymer component (B-6) was performed except that in the production of the ethylene polymer component (B-6), the prepolymerized catalyst component and the polymerization conditions were changed as shown in Table 4, which yielded an ethylene polymer powder. The resultant powder was defined as a measurement sample, and its properties were measured. Result is shown in Table 5.

In Comparative Example 4 which will be described later, this ethylene polymer powder was used as an ethylene polymer component (B-7).

[Ethylene Polymer Component (B-8)]

An ethylene polymer (product name: MIRASON 11P) commercially available from Du Pont-Mitsui Polychemicals Co., Ltd. was used. The pellet product was defined as a measurement sample, and its properties were measured. Result is shown in Table 5.

In Comparative Example 5 which will be described later, this ethylene polymer was used as an ethylene polymer component (B-8).

[Table 4]

TABLE 4

|  |  |  | Ethylene Polymer Component (B) | |
| --- | --- | --- | --- | --- |
|  |  |  | B-6 | B-7 |
| Polymerization conditions | Prepolymerized catalyst component | Number | XP-7 | XP-8 |
|  | Catalyst amount | mmol-Zr/h | 0.36 | 0.3 |
|  | Ethylene | kg/h | 8 | 5.5 |
|  | 1-hexene | kg/h | 0.65 | 0.45 |
|  | TIBAL | mmol/h | 20 | 20 |
|  | Polymerization temperature | ° C. | 80 | 70 |
|  | Polymerization pressure | MPa · G | 0.8 | 0.8 |
|  | Residence time | hr | 2.5 | 2.5 |
|  | Vapor phase: hydrogen/ethylene ratio | m.r. | 0.0065 | 0.0020 |

[Table 5]

TABLE 5

| | | | Ethylene Polymer Component (B) | | | |
| --- | --- | --- | --- | --- | --- | --- |
| | | | B-1 | B-2 | B-3 | B-4 |
| Properties | Catalyst | | XP-3 | XP-3 | XP-4 | XP-5 |
| | Melt flow rate ($MFR_B$) | g/10 min | 7 | 0.5 | 15 | 2 |
| | Density ($D_B$) | kg/m$^3$ | 920 | 920 | 920 | 920 |
| | (Me + Et) (/1000 C.) | | 0.4 | 0.5 | 0.4 | 0.4 |
| | Mw | — | 131700 | 152500 | 123000 | 159000 |
| | $\eta_0$ | P | 90900 | 610500 | 22900 | 105000 |
| | $\eta_0/Mw^{6.8}$ | — | 1.40E−30 | 3.46E−30 | 5.60E−31 | 4.48E−31 |
| | [η] | dl/g | 1.24 | 1.45 | 1.16 | 1.43 |
| | [η]/Mw$^{0.776}$ | — | 0.000132 | 0.000138 | 0.000130 | 0.000132 |

| | | | Ethylene Polymer Component (B) | | | |
| --- | --- | --- | --- | --- | --- | --- |
| | | | B-5 | B-6 | B-7 | B-8 |
| Properties | Catalyst | | XP-6 | XP-7 | XP-8 | — |
| | Melt flow rate ($MFR_B$) | g/10 min | 6 | 7 | 16 | 7 |
| | Density ($D_B$) | kg/m$^3$ | 915 | 940 | 950 | 917 |

TABLE 5-continued

|  |  |  |  |  |  |
|---|---|---|---|---|---|
| (Me + Et) (/1000 C.) |  | 0.3 | 0.5 | 0.5 | 9.4 |
| Mw | — | 163000 | 140000 | 121000 | 470000 |
| $\eta_0$ | P | 98600 | 19700 | 9500 | 19600 |
| $\eta_0/Mw^{6.8}$ | — | 3.56E−31 | 2.00E−31 | 2.60E−31 | 5.2E−35 |
| $[\eta]$ | dl/g | 1.38 | 1.10 | 1.01 | 1.14 |
| $[\eta]/Mw^{0.776}$ | — | 0.000125 | 0.000112 | 0.000115 | 0.000045 |

Example 1

The ethylene polymer component (A-1) was mixed with the ethylene polymer component (B-1) at a ratio shown in Table 6. The resultant was mixed with 500 ppm of SUMILIZER (registered trademark) GP (manufactured by Sumitomo Chemical Co., Ltd.), followed by dry blending. The dry-blend was melt-kneaded with a single-screw extruder manufactured by Placo Co., Ltd. (40 mm in diameter) at a temperature of 190° C. and an extrusion amount of 5 Kg/h. The resultant pellet was molten with a pressing machine at a forming temperature of 190° C. (upper part/lower part), and underwent primary pressure application for 5 minutes (degassing: ten times) and secondary pressure application for 5 minutes (50 kgf/cm²), and thereafter solidified by cooling at 20° C. for 4 minutes. This resulted in preparing a press sheet having a thickness of 1.0 mm. This sheet was cut into a size of 85 mm×85 mm. The cut sheet was sequentially stretched with a biaxial stretching machine (KARO IV manufactured by Brückner) at a stretching ratio of 5 in MD and 8 in TD at a stretching rate of 1 m/min. As a result, a film having a thickness of 25 μm was obtained. A temperature range in which this stretching was possible and thickness accuracy of the stretched film were measured by the method described above. Result is shown in Table 6.

Example 2

Example 1 was repeated except that the ethylene polymer composition component (A-1) and the ethylene polymer component (B-1) were used at a ratio shown in Table 6, thereby producing a resin composition, producing a raw fabric sheet and stretch-processing a film. Their evaluations were also made. Result obtained is shown in Table 6.

Example 3

Example 1 was repeated except that the ethylene polymer composition component (A-1) and the ethylene polymer component (B-2) were used at a ratio shown in Table 6, thereby producing a resin composition, producing a raw fabric sheet and stretch-processing a film. Their evaluations were also made. Result obtained is shown in Table 6.

Example 4

Example 1 was repeated except that the ethylene polymer composition component (A-1) and the ethylene polymer component (B-3) were used at a ratio shown in Table 6, thereby producing a resin composition, producing a raw fabric sheet and stretch-processing a film. Their evaluations were also made. Result obtained is shown in Table 6.

Example 5

Example 1 was repeated except that the ethylene polymer composition component (A-2) and the ethylene polymer component (B-1) were used at a ratio shown in Table 6, thereby producing a resin composition, producing a raw fabric sheet and stretch-processing a film. Their evaluations were also made. Result obtained is shown in Table 6.

Example 6

Example 1 was repeated except that the ethylene polymer composition component (A-3) and the ethylene polymer component (B-4) were used at a ratio shown in Table 6, thereby producing a resin composition, producing a raw fabric sheet and stretch-processing a film. Their evaluations were also made. Result obtained is shown in Table 6.

Example 7

Example 1 was repeated except that the ethylene polymer composition component (A-4) and the ethylene polymer component (B-1) were used at a ratio shown in Table 6, thereby producing a resin composition, producing a raw fabric sheet and stretch-processing a film. Their evaluations were also made. Result obtained is shown in Table 6.

Example 8

Example 1 was repeated except that the ethylene polymer composition component (A-5) and the ethylene polymer component (B-5) were used at a ratio shown in Table 6, thereby producing a resin composition, producing a raw fabric sheet and stretch-processing a film. Their evaluations were also made. Result obtained is shown in Table 6.

Comparative Example 1

Example 1 was repeated except that the ethylene polymer composition component (A-1) and the ethylene polymer component (B-1) were used at a ratio shown in Table 6, thereby producing a resin composition, producing a raw fabric sheet and stretch-processing a film. Their evaluations were also made. Result obtained is shown in Table 6.

In Comparative Example 1, the amount of the ethylene polymer component (B-1) exceeds the upper limit defined in the present invention, so that the film stretching temperature range is inferior.

Comparative Example 2

Example 1 was repeated except that the ethylene polymer composition component (A-1) and the ethylene polymer component (B-1) were used at a ratio shown in Table 6, thereby producing a resin composition, producing a raw fabric sheet and stretch-processing a film. Their evaluations were also made. Result obtained is shown in Table 6.

In Comparative Example 2, the amount of the ethylene polymer component (B-1) exceeds the upper limit defined in the present invention, so that film stretching temperature range is inferior.

Comparative Example 3

Example 1 was repeated except that the ethylene polymer composition component (A-1) and the ethylene polymer component (B-6) were used at a ratio shown in Table 6, thereby producing a resin composition, producing a raw fabric sheet and stretch-processing a film. Their evaluations were also made. Result obtained is shown in Table 6.

In Comparative Example 3, the density of the ethylene polymer component (B-6) exceeds the upper limit of the requirement (B-2) defined in the present invention, so that the film stretching temperature range and thickness accuracy are inferior.

Comparative Example 4

Example 1 was repeated except that the ethylene polymer composition component (A-1) and the ethylene polymer component (B-7) were used at a ratio shown in Table 6, thereby producing a resin composition, producing a raw fabric sheet and stretch-processing a film. Their evaluations were also made. Result obtained is shown in Table 6.

In Comparative Example 4, the density of the ethylene polymer component (B-7) exceeds the upper limit of the requirement (B-2) defined in the present invention, so that film the stretching temperature range and thickness accuracy are inferior.

Comparative Example 5

Example 1 was repeated except that the ethylene polymer composition component (A-5) and the ethylene polymer component (B-8) were used at a ratio shown in Table 6, thereby producing a resin composition, producing a raw fabric sheet and stretch-processing a film. Their evaluations were also made. Result obtained is shown in Table 6.

In Comparative Example 5, $[\eta_0/Mw^{6.8}]$ of the ethylene polymer component (B-8) is smaller than the lower limit of the requirement (B-4) defined in the present invention, so that the film thickness accuracy is inferior.

[Table 6]

TABLE 6

| | | | Example 1 | Example 2 | Example 3 | Example 4 | Example 5 | Example 6 | Example 7 | Example 8 |
|---|---|---|---|---|---|---|---|---|---|---|
| Properties | Composition | | E-1 | E-2 | E-3 | E-4 | E-5 | E-6 | E-7 | E-8 |
| | Density | kg/m³ | 911 | 912 | 913 | 912 | 912 | 918 | 923 | 925 |
| | MFR (190° C.) | g/10 min | 0.5 | 0.74 | 0.44 | 0.97 | 0.20 | 2.52 | 0.79 | 1.98 |
| | G'/(G" ω) (ω = 0.01 sec⁻¹) | sec | 7 | 11 | 20 | 7 | 20 | 11 | 13 | 4.64 |
| Component (B) | Type | | B-1 | B-1 | B-2 | B-3 | B-1 | B-4 | B-1 | B-5 |
| | Weight fraction $[W_B]$ | — | 0.2 | 0.4 | 0.4 | 0.4 | 0.4 | 0.3 | 0.3 | 0.13 |
| Component (A) | Type | | A-1 | A-1 | A-1 | A-1 | A-2 | A-3 | A-4 | A-5 |
| | Weight fraction $[W_A]$ | — | 0.8 | 0.6 | 0.6 | 0.6 | 0.6 | 0.7 | 0.7 | 0.87 |
| Film | Temperature at which stretching was possible | ° C. | 108-114 | 106-112 | 108-114 | 106-112 | 110-116 | 104-108 | 112-120 | 108-116 |
| | Stretched film 2σ/x | % | 7 | 8 | 8 | 8 | 7 | 7 | 9 | 10 |

| | | | Comparative Example 1 | Comparative Example 2 | Comparative Example 3 | Comparative Example 4 | Comparative Example 5 |
|---|---|---|---|---|---|---|---|
| Properties | Composition | | E-9 | E-10 | E-11 | E-12 | E-13 |
| | Density | kg/m³ | 917 | 920 | 920 | 923 | 926 |
| | MFR (190° C.) | g/10 min | 1 | 1.89 | 0.73 | 0.89 | 1.86 |
| | G'/(G" ω) (ω = 0.01 sec⁻¹) | sec | 18 | 28 | 8 | 6 | 4.40 |
| Component (B) | Type | | B-1 | B-1 | B-6 | B-7 | B-8 |
| | Weight fraction $[W_B]$ | — | 0.6 | 0.8 | 0.4 | 0.4 | 0.13 |
| Component (A) | Type | | A-1 | A-1 | A-1 | A-1 | A-5 |
| | Weight fraction $[W_A]$ | — | 0.4 | 0.2 | 0.6 | 0.6 | 0.87 |
| Film | Temperature at which stretching was possible | ° C. | 110 | stretching impossible | 114 | 116 | 110-116 |
| | Stretched film 2σ/x | % | 11 | — | 15 | 15 | 13 |

The invention claimed is:

1. A biaxially-stretched film obtained from an ethylene polymer composition (E) comprising an ethylene polymer component (A) fulfilling requirements described below and an ethylene polymer component (B) fulfilling requirements described below, wherein a weight fraction $[W_A]$ of the ethylene polymer component (A) is 0.50 or more and 0.87 or less, and a weight fraction $[W_B]$ of the ethylene polymer component (B) is 0.13 or more and 0.50 or less provided that $W_A$ and $W_B$ total 1.0, wherein the ethylene polymer component (A) comprises an ethylene polymer (a) and fulfills requirements (A-1) to (A-3) described below:

(A-1) Melt flow rate ($MFR_A$) at 190° C. under a load of 2.16 kg is not less than 0.1 g/10 min and not more than 3 g/10 min;
(A-2) Density ($D_A$) is 907 kg/m³ or more and 940 kg/m³ or less; and
(A-3) Ratio $[\eta]/Mw^{0.776}$ of intrinsic viscosity measured in decalin at 135° C. $[[\eta](dl/g)]$ to weight average molecular weight measured by GPC-viscometry (GPC-VISCO) to the power 0.776 ($Mw^{0.776}$) is not less than $1.90 \times 10^{-4}$ and not more than $2.80 \times 10^{-4}$, and wherein the ethylene polymer component (B) is a copolymer of ethylene and an α-olefin having 4 to 10 carbon atoms and fulfills requirements (B-1) to (B-5) described below:

(B-1) Melt flow rate ($MFR_B$) at 190° C. under a load of 2.16 kg is not less than 0.01 g/10 min and not more than 30 g/10 min;
(B-2) Density ($D_B$) is 915 kg/m³ or more and 939 kg/m³ or less;
(B-3) Sum of the number of methyl branches [Me(/1000C)] and the number of ethyl branches [Et(/1000C)] per 1000 carbon atoms in $^{13}$C-NMR analysis [(Me+Et)(/1000C)] is not more than 1.80;
(B-4) Ratio $\eta_0/Mw^{6.8}$ of zero shear viscosity at 200° C. $[\eta_0(P)]$ to weight average molecular weight measured by GPC-viscometry (GPC-VISCO) to the power 6.8 ($Mw^{6.8}$) is not less than $0.03 \times 10^{-30}$ and not more than $7.5 \times 10^{-30}$; and
(B-5) Ratio $[\eta]/Mw^{0.776}$ of intrinsic viscosity measured in decalin at 135° C. $[[\eta](dl/g)]$ to weight average molecular weight measured by GPC-viscometry (GPC-VISCO) to the power 0.776 ($Mw^{0.776}$) is not less than $0.90 \times 10^{-4}$ and not more than $1.65 \times 10^{-4}$, wherein the ethylene polymer (a) is a copolymer of ethylene and an α-olefin having 4 to 10 carbon atoms and fulfills requirements (a-1) to (a-3) described below:
(a-1) Melt flow rate ($MFR_a$) at 190° C. under a load of 2.16 kg is not less than 0.1 g/10 min and not more than 0.6 g/10 min.;
(a-2) Density ($D_a$) is 890 kg/m³ or more and 928 kg/m³ or less; and
(a-3) $(D_B - D_a) \geq 1$ kg/m³, wherein the ethylene polymer component (A) comprises the ethylene polymer (a) at 40% by weight or more, an ethylene polymer (c) at 20% by weight or more and 40% by weight or less, and an ethylene polymer (d) at 10% by weight or more and 40% by weight or less, wherein the ethylene polymer (c) is a copolymer of ethylene and an α-olefin having 4 to 10 carbon atoms and fulfills requirements (c-1) to (c-4) described below, but does not fall within the ethylene polymer (a):
(c-1) Melt flow rate ($MFR_c$) at 190° C. under a load of 2.16 kg is not less than 30 g/10 min and not more than 60 g/10 min;
(c-2) $(MFR_c - MFR_a) \geq 1$ g/10 min;
(c-3) Density ($D_c$) is 910 kg/m³ or more and 940 kg/m³ or less; and
(c-4) $(D_c - D_a) \geq 1$ kg/m³, and wherein the ethylene polymer (d) is an ethylene homopolymer or a copolymer of ethylene and an α-olefin having 3 to 10 carbon atoms and fulfills requirements (d-1) and (d-2) described below:
(d-1) Melt flow rate ($MFR_d$) at 190° C. under a load of 2.16 kg is not less than 0.1 g/10 min and not more than 1 g/10 min.; and
(d-2) Density ($D_d$) is 945 kg/m³ or more and 980 kg/m³ or less.

2. The biaxially-stretched film according to claim 1, having 5 to 10% of a thickness accuracy represented by $(A_{MD} \times A_{TD})^{1/2}$, wherein $A_{MD}$ is a thickness accuracy about the longitudinal direction (MD) of the biaxially-stretched film and $A_{TD}$ is a thickness accuracy about the transverse direction (TD), each thickness accuracy being represented by $2\sigma/x$, wherein σ and x are the standard deviation and the average thickness, respectively, of thicknesses of the biaxially-stretched film measured by cutting the biaxially-stretched film to A3 size and measuring thickness at 45 points in the longitudinal direction or at 45 points in the transverse direction.

3. An ethylene polymer composition comprising an ethylene polymer component (A) fulfilling requirements described below and an ethylene polymer component (B) fulfilling requirements described below, wherein a weight fraction [$W_A$] of the ethylene polymer component (A) is 0.50 or more and 0.87 or less, and a weight fraction [$W_B$] of the ethylene polymer component (B) is 0.13 or more and 0.50 or less, provided that $W_A$ and $W_B$ total 1.0, wherein the ethylene polymer component (A) comprises an ethylene polymer (a) and fulfills requirements (A-1) to (A-3) described below:
(A-1) Melt flow rate ($MFR_A$) at 190° C. under a load of 2.16 kg is not less than 0.1 g/10 min and not more than 3 g/10 min.;
(A-2) Density ($D_A$) is 907 kg/m³ or more and 940 kg/m³ or less; and
(A-3) Ratio $[\eta]/Mw^{0.776}$ of intrinsic viscosity measured in decalin at 135° C. $[[\eta](dl/g)]$ to weight average molecular weight measured by GPC-viscometry (GPC-VISCO) to the power 0.776 ($Mw^{0.776}$) is not less than $1.90 \times 10^{-4}$ and not more than $2.80 \times 10^{-4}$, and wherein the ethylene polymer component (B) is a copolymer of ethylene and an α-olefin having 4 to 10 carbon atoms, and fulfills requirements (B-1) to (B-5) described below:

(B-1) Melt flow rate ($MFR_B$) at 190° C. under a load of 2.16 kg is not less than 0.01 g/10 min and not more than 30 g/10 min;
(B-2) Density ($D_B$) is 915 kg/m³ or more and 939 kg/m³ or less;
(B-3) Sum of the number of methyl branches [Me(/1000C)] and the number of ethyl branches [Et(/1000C)] per 1000 carbon atoms in $^{13}$C-NMR analysis [(Me+Et)(/1000C)] is not more than 1.80;
(B-4) Ratio $\eta_0/Mw^{6.8}$ of zero shear viscosity at 200° C. $[\eta_0(P)]$ to weight average molecular weight measured by GPC-viscometry (GPC-VISCO) to the power 6.8 ($Mw^{6.8}$) is not less than $0.03 \times 10^{-30}$ and not more than $7.5 \times 10^{-30}$; and
(B-5) Ratio $[\eta]/Mw^{0.778}$ of intrinsic viscosity measured in decalin at 135° C. $[[\eta](dl/g)]$ to weight average molecular weight measured by GPC-viscometry (GPC-VISCO) to the power 0.776 ($Mw^{0.778}$) is not less than $0.90 \times 10^{-4}$ and not more than $1.65 \times 10^{-4}$, wherein the ethylene polymer (a) is a copolymer of ethylene and an α-olefin having 4 to 10 carbon atoms, and fulfills requirements (a-1) to (a-3) described below:
(a-1) Melt flow rate ($MFR_a$) at 190° C. under a load of 2.16 kg is not less than 0.1 g/10 min and not more than 0.6 g/10 min;
(a-2) Density ($D_a$) is 890 kg/m³ or more and 928 kg/m³ or less; and
(a-3) $(D_B - D_a) \geq 1$ kg/m³, wherein the ethylene polymer component (A) comprises the ethylene polymer (a) at 40% by weight or more, an ethylene polymer (c) at 20% by weight or more and 40% 50% by weight or less, and an ethylene polymer (d) at 10% by weight or more and 40% 50% by weight or less, wherein the ethylene polymer (c) is a copolymer of ethylene and an α-olefin having 4 to 10 carbon atoms and fulfills requirements (c-1) to (c-4) described below, but does not fall within the ethylene polymer (a):

(c-1) Melt flow rate ($MFR_c$) at 190° C. under a load of 2.16 kg is not less than 30 g/10 min and not more than 60 g/10 min;

(c-2) ($MFR_c - MFR_a$) ≥ 1 g/10 min;

(c-3) Density ($D_c$) is 910 kg/m$^3$ or more and 940 kg/m$^3$ or less; and (c-4) ($D_c - D_a$) ≥ 1 kg/m$^3$, and wherein the ethylene polymer (d) is an ethylene homopolymer or a copolymer of ethylene and an α-olefin having 3 to 10 carbon atoms and fulfills requirements (d-1) and (d-2) described below:

(d-1) Melt flow rate ($MFR_d$) at 190° C. under a load of 2.16 kg is not less than 0.1 g/10 min and not more than 1 g/10 min.; and (d-2) Density ($D_d$) is 945 kg/m$^3$ or more and 980 kg/m$^3$ or less.

* * * * *